(12) United States Patent
Kamei et al.

(10) Patent No.: US 7,719,726 B2
(45) Date of Patent: May 18, 2010

(54) IMAGE READING APPARATUS AND METHOD OF DISPLAYING ALIEN SUBSTANCE LOCATION THEREOF

(75) Inventors: Masafumi Kamei, Kashiwa (JP); Tetsuro Fukusaka, Abiko (JP); Kazunori Togashi, Toride (JP); Katsuhiro Ishido, Abiko (JP); Takashi Soya, Abiko (JP); Yuichi Makino, Abiko (JP); Jiro Futagawa, Tokyo (JP); Shohei Takeda, Toride (JP); Shinichiro Wakahara, Tokyo (JP)

(73) Assignee: Canon Kabushiki Kaisha (JP)

( * ) Notice: Subject to any disclaimer, the term of this patent is extended or adjusted under 35 U.S.C. 154(b) by 897 days.

(21) Appl. No.: 11/538,266

(22) Filed: Oct. 3, 2006

(65) Prior Publication Data

US 2007/0291324 A1 Dec. 20, 2007

(30) Foreign Application Priority Data

Oct. 5, 2005 (JP) .............................. 2005-293005

(51) Int. Cl.
*H04N 1/38* (2006.01)
(52) U.S. Cl. ..................... 358/463; 358/474; 382/275
(58) Field of Classification Search ................. 358/474, 358/463; 382/275
See application file for complete search history.

(56) References Cited

U.S. PATENT DOCUMENTS

| | | | | |
|---|---|---|---|---|
| 5,202,556 A | * | 4/1993 | Kawabata et al. | 250/208.1 |
| 6,075,621 A | * | 6/2000 | Takeuchi et al. | 358/461 |
| 6,289,134 B1 | * | 9/2001 | Kondo et al. | 382/274 |
| 6,750,990 B1 | * | 6/2004 | Ohashi | 358/496 |
| 6,792,161 B1 | * | 9/2004 | Imaizumi et al. | 382/275 |
| 6,996,289 B1 | * | 2/2006 | Tsutamori et al. | 382/275 |
| 2002/0071135 A1 | * | 6/2002 | Takeda et al. | 358/1.14 |
| 2003/0090742 A1 | * | 5/2003 | Fukuda et al. | 358/448 |
| 2004/0125412 A1 | * | 7/2004 | Sugeta | 358/3.26 |
| 2007/0211311 A1 | * | 9/2007 | Korhonen et al. | 358/498 |
| 2010/0020369 A1 | * | 1/2010 | Harada | 358/475 |

FOREIGN PATENT DOCUMENTS

| | | | |
|---|---|---|---|
| JP | 2001-144901 A | | 5/2001 |
| JP | 2002-077584 A | | 3/2002 |
| JP | 2002-185705 A | | 6/2002 |
| JP | 2002-368963 A | | 12/2002 |
| JP | 2002368932 A | | 12/2002 |
| JP | 2004297443 A | * | 10/2004 |

* cited by examiner

*Primary Examiner*—King Y Poon
*Assistant Examiner*—Kenneth Kwan
(74) *Attorney, Agent, or Firm*—Rossi, Kimms & McDowell LLP

(57) ABSTRACT

There is provided an image reading apparatus for acquiring a read signal of an image by receiving and photoelectrically converting a light reflected from a document. The location of an alien substance on an original plate is detected based on a reflected light received by a light receiving unit adapted to receive a light reflected from a document. When an alien substance is detected, an illumination unit selectively illuminates the location in which the alien substance has been detected. Also, a message which prompts cleaning of the alien substance is displayed. A method of displaying the alien substance location are also provided. Thereby, the image reading apparatus of the present invention can assists a user in cleaning the alien substance such as a dust or dirt on the original plate.

14 Claims, 23 Drawing Sheets

FIG. 1B

| | | |
|---|---|---|
| 124 ROM | SYSTEM PROGRAM | ~124a |
| | IMAGE PROCESSING CONTROL PROGRAM | ~124b |
| | IMAGE OUTPUT CONTROL PROGRAM | ~124c |
| | IMAGE READING CONTROL PROGRAM | ~124d |
| | ALIEN SUBSTANCE DETECTION MODULE | ~124e |
| | LIGHTING LOCATION CONTROL MODULE | ~124f |
| | ALIEN SUBSTANCE CLEANING MODULE | ~124g |
| | ALIEN SUBSTANCE DATA CORRECTION MODULE | ~124h |
| | MESSAGE DISPLAY/INSTRUCTION INPUT MODULE | ~124i |
| | OTHER PROGRAMS | |
| 122 EEPROM | READING MODE FLAG | ~122a |
| | CLEANING MODE FLAG | ~122b |
| | ALIEN SUBSTANCE CLEANING PRIORITY MODE FLAG | ~122c |
| | IMAGE CORRECTION MODE FLAG | ~122d |
| | TIMEOUT TIME TABLE | ~122e |
| | MESSAGE FORMAT (DISPLAY OF WARNING, CLEANING OF ALIEN SUBSTANCE, CONFIRMATION OF APPROVAL...) | ~122f |
| | ALIEN SUBSTANCE DETECTION FLAG | ~122g |
| | ALIEN SUBSTANCE LOCATION INFORMATION | ~122h |
| | LIGHT-EMISSION LOCATION INFORMATION | ~122i |
| | LAMP LIGHTING TIME | ~122j |
| | OTHER PARAMETERS | |
| 123, 111 RAM | DOCUMENT FEEDER OPEN/CLOSE FLAG | ~123a |
| | DOCUMENT PRESENCE/ABSENCE FLAG | ~123b |
| | NUMBER OF TIMES OF PUSHING COPY BUTTON | ~123c |
| | DISPLAY MESSAGE | ~123d |
| | TIMEOUT COUNTER | ~123e |
| | OTHER DATA/PARAMETERS | |
| | IMAGE DATA STORAGE AREA | ~123f |
| | PROGRAM LOAD AREA | ~123g |

F I G. 9C
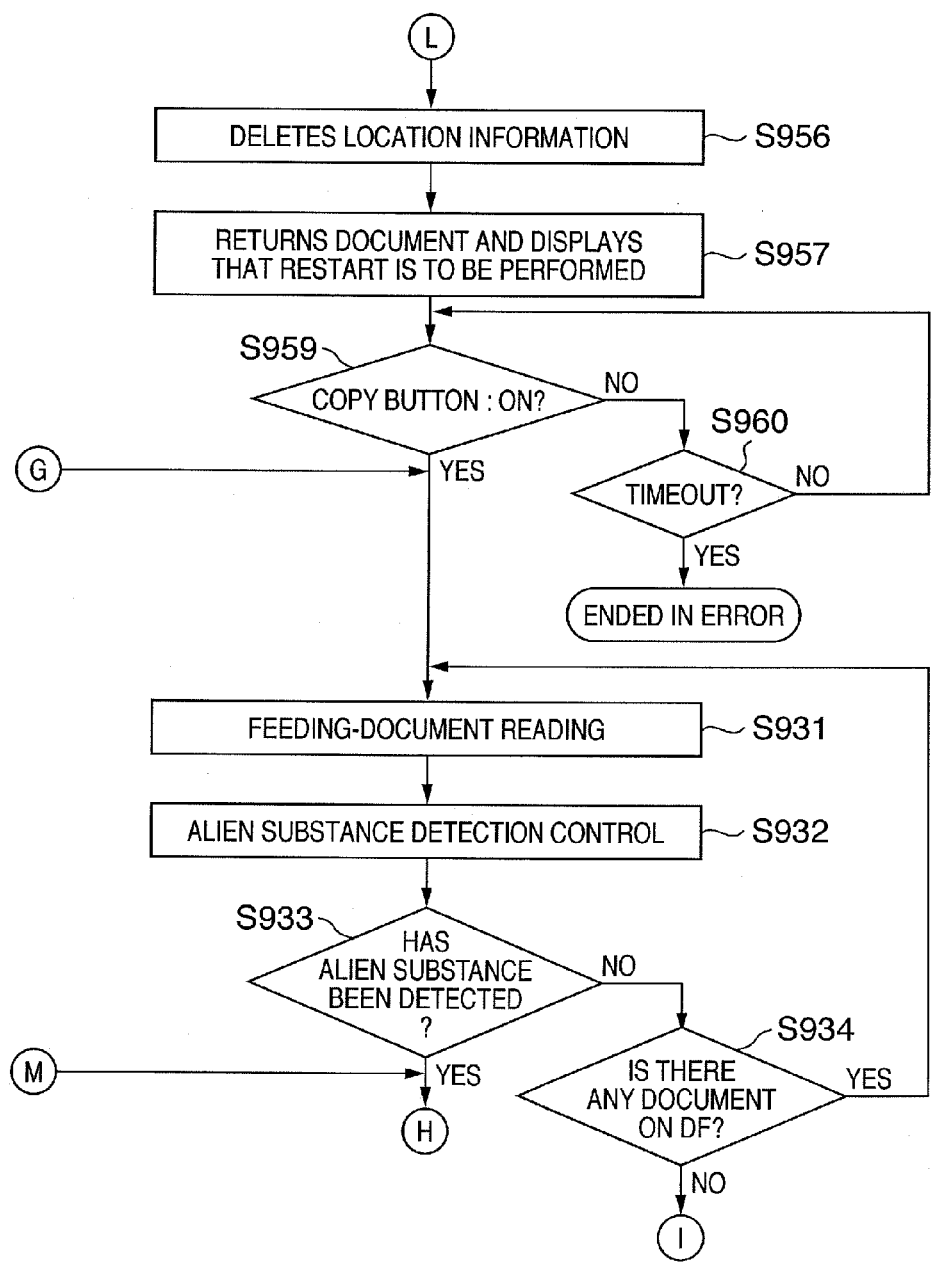

IMAGE READING APPARATUS AND METHOD OF DISPLAYING ALIEN SUBSTANCE LOCATION THEREOF

BACKGROUND OF THE INVENTION

1. Field of the Invention

The present invention relates to an image reading apparatus and a method of displaying an alien substance location thereof, and in particular to assistance provided to a user to realize elimination of an alien substance on a light path between a document and a reading device in a document-feed-type image reading system, which is a factor of a line-like image, by clearly showing the location of the alien substance in an actual machine.

2. Description of the Related Art

Conventionally, an image reading apparatus equipped with an auto document feeder (ADF) is known. The image reading apparatus is provided with a "feeding-document reading mode" for reading documents with moving the documents at a constant speed one by one by the auto document feeder, while an optical scanning unit for emitting light to the document and scanning light reflected from the document is stopped at a predetermined document reading location. In this "feeding-document reading mode", since the documents only have to be simply moved in a constant direction, there is a merit that the time elapsed from a document reading to another document reading is shorter in comparison with a scanning operation of the optical scanning unit in the case of continuously reading a great number of documents.

However, in this "feeding-document reading mode", there is a problem that, if dust or dirt adheres to the document reading location of an original plate, a black line-like image occurs on a read image in a sub-scanning direction at a location corresponding to the location of the dust or dirt. Accordingly, as a method of solving the problem of the occurrence of a black line-like image, the methods as shown below have been proposed.

Prior-art Example 1

There is provided a unit for detecting occurrence of a black line-like image which may be caused by dust or dirt on original plate. By rotating a feeding belt for auto document feeding while reading with non-document, detection of dust is performed based on an image read from a non-document area at a document feeding location on the original plate. If it is judged that dust or dirt adheres, then a display which prompts cleaning of the original plate is performed, or the document reading location is changed to a location where there is no dust or dirt (see JPA 2001-144901).

Prior-art Example 2

There is provided a unit for detecting occurrence of a black line-like image which may be caused by dust or dirt on original plate. By rotating a feeding belt for auto document feeding while reading with non-document, detection of dust is performed based on an image read from a non-document area at a document feeding location on the original plate. If it is judged that dust or dirt adheres, the mode is switched from the "feeding-document reading mode" to a "fixed-document reading mode" in which a fixed-document is read with moving the optical system (see JPA 2002-185705).

Prior-art Example 3

There is provided a unit for detecting occurrence of a black line-like image which may be caused by dust or dirt on original plate so that detection of dust from a read image is performed. If it is judged that dust or dirt adheres, the values of the pixels corresponding to the portion in the read image where dust or dirt has been detected are interpolated using the values of multiple pixels adjacent to the dust or dirt according to the width of the dust or dirt (see JPA 2002-77584).

Prior-art Example 4

There is provided a unit for detecting occurrence of a black line-like image caused by dust or dirt on original plate. If it is judged that dust or dirt adheres, a cleaning roller is automatically rotated so that the surface of original plate is automatically cleaned (see JPA 2002-368963).

Prior-art Example 5

There is provided a unit for detecting a location of a black line-like image which may occur due to dust or dirt on original plate so that detection of a location of the dust is performed from a read image. If it is judged that dust or dirt adheres, the pixels at the location on the read image where dust or dirt has been detected are corrected, and the corrected location of the pixels is displayed on an operation unit or transfer paper to notify a user that document information has been changed and warn him to check whether or not a problem occurs (see JPA 2002-368932).

However, in JPA 2001-144901, though it is possible to automatically move the reading location, a user is required to clean the original plate if dust or dirt adheres at all the reading locations.

In JPA 2002-185705, though it is possible to switch the mode to the "fixed-document reading mode", productivity of reading is decreased, and this technique can be realized only in the configuration of a belt-feeding system.

In JPA 2002-77584, though it is possible to make interpolation of an image, it is only realized by replacing data with data estimated from peripheral pixels, and then it is impossible to obtain the same image information as would be obtained in the case of the original document having been read correctly. Therefore, the cause of the abnormal image cannot be improved perfectly.

In JPA 2002-368963, though it is possible to automatically clean the surface of original plate, the surface cannot be completely cleaned depending on the kind of dust or dirt.

In JPA 2002-368932, though it is possible to display the location of dust or dirt on an operation unit or transfer paper to notify it to a user, it is difficult for the user to confirm the detailed location of dust or dirt from the display of the location on the operation unit, or the display of the location on transfer paper is not necessarily the best way for the user.

As described above, in order to completely remove the line-like image caused due to dust or dirt, it is the most effective to have a user clean the original plate. However, in the prior image reading apparatuses, since it is difficult to find a dust or dirt adhering to the document plate, it is also difficult to confirm where the dust or dirt adheres or whether or not the dust or dirt has been removed by cleaning.

SUMMARY OF THE INVENTION

In consideration of the above situation, the object of the present invention is to provide an image reading apparatus capable of assisting a user in cleaning dust or dirt on original plate, and a method of displaying an alien substance location for the apparatus.

The present invention is intended to completely eliminate wasteful printouts such as printouts having a line-like image, and a configuration is provided in which a location of an alien substance causing a line-like image can be displayed on an actual machine so that the factor of a line-like image can be certainly removed before image formation. That is, the present invention provides an apparatus which, if a factor of a line-like image is detected before start of document feeding or between documents being fed, stops the document feeding, prompts a user elimination of the factor on an operation panel, and clearly shows the location of the alien substance causing a line-like image to a user using a document illumination unit.

The present invention provides an image reading apparatus for acquiring a read signal of an image by receiving and photoelectrically converting a light reflected from a document, comprising: an illumination unit having a plurality of light emitting elements adapted to illuminate a document; a light receiving unit adapted to receive a light reflected from the document; an alien substance detection unit adapted to detect a location of an alien substance on an original plate, based on the reflected light received by the light receiving unit; and an illumination control unit adapted to control the light emitting elements of the illumination unit to selectively illuminate the location in which the alien substance has been detected by the alien substance detection unit.

The present invention also provides an image processing apparatus including the image reading apparatus, the image reading apparatus comprising: an illumination unit having a plurality of light emitting elements adapted to illuminate a document; a light receiving unit adapted to receive a light reflected from the document; an alien substance detection unit adapted to detect a location of an alien substance on an original plate, based on the reflected light received by the light receiving unit; and an illumination control unit adapted to control the light emitting elements of the illumination unit to selectively illuminate the location in which the alien substance has been detected by the alien substance detection unit.

The present invention also provides a method of controlling an image reading apparatus for acquiring a read signal of an image by receiving and photoelectrically converting a light reflected from a document, the method comprising the steps of: detecting a location of an alien substance on an original plate based on a reflected light received by a light receiving unit adapted to receive a light reflected from a document; and controlling an illumination unit adapted to illuminate a document, to selectively illuminate the location in which the alien substance has been detected when the alien substance has been detected in the alien substance detection step.

The present invention further provides a method of displaying an alien substance location in an image reading apparatus for acquiring a read signal of an image by receiving and photoelectrically converting a light reflected from a document, the method comprising the steps of: detecting a location of an alien substance on an original plate, based on a reflected light received by a light receiving unit adapted to receive a light illuminated by an illumination unit and reflected from a document; and selectively displaying a location in which the alien substance is detected, in relation to the location of the detected alien substance.

The present invention is intended to completely eliminate wasteful printouts such as a line-like image, and a configuration is provided in which a location of a factor of a line-like image can be displayed on an actual machine so that the factor of a line-like image can be certainly removed before image formation.

That is, by illuminating a pinpointed place on a document reading apparatus where an alien substance actually adheres, with a document illumination unit, the effect of accurately showing the location of the alien substance can be obtained, and by emitting light from inside the apparatus, the effect of facilitating confirmation of the alien substance can be obtained. Thereby, it is possible to enable the work of cleaning and removing the alien substance to be performed in a short time.

Furthermore, when the document illumination unit is lit to make it easy to see the alien substance, light emitting elements other than the light emitting element for the area where the alien substance adheres are not illuminated. Thereby, a user can perform the cleaning work safely without his eyes being irritated too much.

Further features of the present invention will become apparent from the following description of exemplary embodiments (with reference to the attached drawings).

BRIEF DESCRIPTION OF THE DRAWINGS

FIGS. 9A to 9D are control flowcharts in an image reading apparatus equipped with a belt-feeding type document feeder;

DESCRIPTION OF THE EMBODIMENTS

Figure 1:
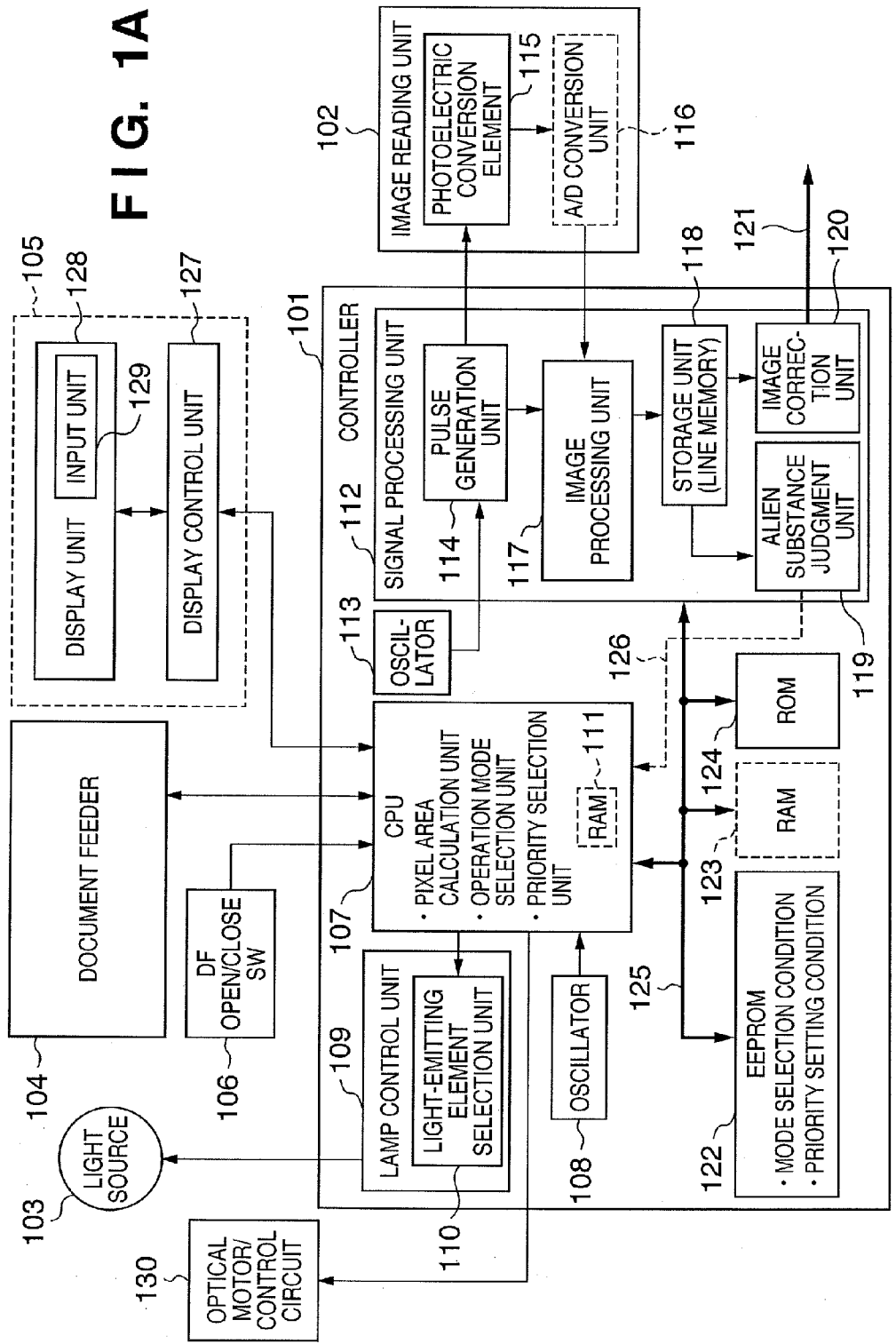
FIG. 1A is a block diagram showing an example of the configuration of an image reading apparatus of this embodiment.
FIG. 1B is a diagram showing an example of the configuration of a memory (ROM, internal RAM, external RAM or EEPROM) of this embodiment.

An embodiment of an image reading apparatus of the present invention will be described below. The image reading apparatus of the present invention may be a standalone apparatus, or a part of an apparatus which is combined with other functions, such as a copying machine, a facsimile machine or other multifunction machines.

Example of the Configuration of the Image Reading Apparatus of this Embodiment FIG. 1A is a block diagram showing an example of the configuration of an image reading apparatus of this embodiment.

First, reference numeral 101 denotes a controller of the image reading apparatus, which Includes a signal processing unit 112 (which works as a alien substance detection unit in FIG. 11 of this embodiment) and a lamp control unit 109 according to this embodiment. A CPU 107 exists as a processing unit of the image reading apparatus. Conditions and the like generated during operation of the apparatus are temporarily stored in an internal RAM 111 or an external RAM 123. In a ROM 124, a main program of the image reading apparatus is stored.

Recently, a ROM is often configured by a semiconductor memory such as a flash memory, in which a program can be rewritten. During the period of improvement of software stability before transition to an inexpensive mask ROM, a flash memory is often used. An EEPROM 122 is a backup memory, which is a memory (storage device) for backing up the content of settings and the like which should not be erased when power is off, such as operation modes of the apparatus and the result of adjustments at a factory.

An ASIC is assumed as the signal processing unit 112, and the signal processing unit 112 is configured so that almost all of processing units of this embodiment are integrated therein. Though a lot of detailed processings are involved, the configuration of the ASIC is simply shown in accordance with this embodiment. A pulse generation unit 114 is a unit for generating a drive clock for a photoelectric conversion element 115 (hereinafter referred to as a CCD) such as a CCD, a processing clock (not shown) inside the ASIC, a synchronizing signal (not shown) inside a document reading apparatus, and the like. When a CCD drive pulse outputted from the pulse generation unit 114 and a conversion clock (not shown) for an A/D conversion unit 116 are supplied to an image reading unit 102, an analog output from the CCD 115 is converted to a digital signal (video signal) via the A/D conversion unit 116.

In the image reading apparatus, the black signal level and the white signal level are set inside the apparatus. In this embodiment, adjustments including corrections for the reading level, for light distribution unevenness of a light source (document illumination unit) 103, and for sensitivity unevenness of the CCD 115 and the like are together performed by an image processing unit 117. A video signal (a document image signal or a density signal of a rotating body such as a feeding belt and feed roller between documents) processed by the image processing unit 117 is sent to a storage unit 118 configured by a line memory having multiple lines.

Whether or not an alien substance exists is judged by an alien substance judgment unit 119 based on the data in the storage unit 118, and a judgment result 126 is returned to the CPU 107 via an address/data bus 125 as shown by a broken-line arrow. At the same time, the pixel location on the CCD 115 of the detected alien substance is stored, and the location (not shown) of the alien substance on original plate is calculated. Each of the results is stored in a non-volatile memory (the EEPROM 122 in this example).

The reason for storing alien substance information in a non-volatile memory is shown below. In the case of avoiding cleaning operation of an alien substance detected in a job of the image reading apparatus by performing image processing instead of the cleaning operation, or in the case of executing a job while the default mode is set to an avoidance mode for avoiding cleaning operation, information of an alien substance detected during execution of the job is erased due to turn-off/on of the power of the image reading apparatus. In this embodiment, in order to realize a configuration in which a cleaning assistance function for preventing occurrence of an abnormal image (a line-like image) due to an alien substance is always performed, it is necessary to make it possible to display an alien substance location based on alien substance information stored in the non-volatile storage unit after the power is off/on.

There are some kinds of judgment criteria to be used by the alien substance judgment unit 119. In this example, detection of an alien substance is performed by making comparison with an average value of image signal obtained from an effective image area in main-scanning direction or a threshold value set in advance, and thereby it is possible to detect an alien substance in a short time, such as an interval between documents which are continuously fed. When an alien substance is detected by the alien substance judgment unit 119, linear interpolation is performed by an image correction unit 120 based on data at pixels in the vicinity of the location where the alien substance has been detected. The corrected image data is outputted to a printer apparatus (not shown) along an arrow 121. If an alien substance is not detected, "pass through" is set for the image correction unit 120, and the image data passes through the image correction unit 120 and is outputted to the printer apparatus without image correction.

Reference numerals 108 and 113 denote oscillators for the CPU and the ASIC, respectively. An optical motor/control circuit 130 indicates a document illumination unit (not shown) which includes the light source 103, an optical motor (not shown) and an optical motor driver (not shown) for scanning a document set on original plate (not shown). The light source 103 is configured by LED light emitting elements formed in an array so as to control emission (illumination control) in detail to some degree onto a location where an alien substance (dust or dirt, or scar) to be a factor of a line-like image in sub-scanning direction adheres. On/off control of the light emitting elements is performed by the lamp control unit 109. The lamp control unit 109 is configured, using a light emitting element selection unit 110, a control unit for setting "to be lighted" or "not to be lighted" for each of the light emitting elements. The control of "to be lighted" and "not to be lighted" for the light emitting elements and the light emitting element selection unit 110 will be described later with reference to FIGS. 14, 15 and 16.

In an alien substance location illumination mode, control of the light source 103 is synchronized with a DF (document feeder) open/close SW 106. Control to illuminate an alien substance location is initiated when a document feeder 104 is opened (in synchronization with the open state) after an alien substance is detected. The lamp control unit 109 has a lighting time control function using a timer included in the CPU 107. The lamp control unit 109 functions as a safety mechanism against accidents such as ignition and smoking by monitoring the time for which the lamp is continuously lit during cleaning of an alien substance, and controlling to put off the lamp after a predetermined time has been elapsed. There are various types of the document feeder 104. In this example, description will be made later on examples of a document feeder having a roller-feeding mechanism and another document feeder having a belt-feeding mechanism, both capable of handling a double-side document.

An important point is that, before starting reading of documents, it is possible to spend much time on detection of an alien substance by rotating a document feeding belt or rotating a document feed roller, but, during a job for which feeding-document reading (a reading method in which scanning is performed by relatively moving a document) has already been started, it is necessary to detect an alien substance at an interval between documents to be fed. Accordingly, it is necessary to provide a document size detection unit for determining the kind of document (document size) on the document feeder side. Detection of an alien substance is performed by controlling the alien substance judgment unit 119 within an interval between a document feed completion signal according to the document size and a document image tip signal generated at the document feeder side.

When an alien substance is detected, the detection information of the alien substance and a message prompting cleaning the alien substance are displayed on a display unit (such as a liquid crystal panel) 128 arranged on an operation panel 105. A touch panel (not shown) and an input unit 129 are also arranged on the display unit 128 to set a mode for the apparatus or control light on/off of an alien substance location illumination unit. The content of the display is sent to the display unit 128 via a display control unit 127 and displayed on the display unit 128.

FIG. 1B is a diagram showing an example of the configuration of the memory (including the ROM 124, the EEPROM 122, the internal RAM 111 and the external RAM 123) in FIG. 1A. In FIG. 1B, only storage areas closely related to this embodiment are shown, and other used areas are not shown.

Reference numeral 124*a* denotes a system program for controlling the image reading apparatus or an image processing apparatus (system) including it. The system program may perform centralized control of the image reading apparatus and an image forming apparatus. Alternatively, the system program may control the image reading apparatus, and a separate system program may be provided for the Image forming apparatus or the image processing apparatus (system) so that distributed processing can be performed. Reference numeral 124*b* denotes an image processing control program for controlling image processings (for example, halftone processing and color processing) including the image processing by the image reading apparatus. Reference numeral 124*c* denotes an image output control program for controlling image formation.

The programs described below are also stored in the ROM 124. Reference numeral 124*d* denotes an image reading control program for controlling the image reading apparatus, and the image reading control program includes the programs shown in flowcharts in FIGS. 8A to 8C and FIGS. 9A to 9D described below. Reference numeral 124*e* denotes an alien substance detection module for detection of an alien substance and its location to be used by the image reading control program 124*d*. Reference numeral 124*f* denotes a lighting location control module for controlling the location to light a lamp for illuminating an alien substance location. Reference numeral 124*g* denotes an alien substance cleaning module used when a user instructs cleaning of an alien substance to be performed, and it corresponds to flowcharts in FIGS. 10A and 10B described below. Reference numeral 124*h* denotes an alien substance data correction module for correcting data read from the area of an alien substance in the case of performing reading without cleaning an alien substance. Reference numeral 124*i* denotes a message display/instruction input module for displaying a message to a user on the display unit 128 and inputting an instruction by the user from the input unit 129. The programs may be loaded to a program load area 123*g* of the RAM 123 from an external storage medium (not shown) and then executed by the CPU 107.

The data below to be held even when the power is turned off is stored in the EEPROM 122. Reference numeral 122*a* denotes a reading mode flag indicating whether the image reading apparatus should be operated in a feeding-document reading mode or in a fixed-document reading mode. Reference numeral 122*b* denotes a cleaning mode flag indicating whether or not an instruction to clean an alien substance has been given by a user. Reference numeral 122*c* denotes a alien substance cleaning priority mode flag indicating whether alien substance cleaning should be given priority or image reading should be given priority over cleaning, in the case of detecting the alien substance. Reference numeral 122*d* denotes an image correction mode flag indicating whether or not data read from the area of an alien substance should be corrected.

Reference numeral 122*e* denotes a timeout time table for determining timeout in the above programs. Reference numeral 122*f* denotes a message format for storing the format of a message to be displayed on the display unit 128 (see FIG. 13, for example). Reference numeral 122*g* denotes an alien substance detection flag which is turned on when an alien substance is detected and turned off when cleaning of the alien substance is completed. Reference numeral 122*h* denotes alien substance location information in which the location of a detected alien substance is to be stored. Reference numeral 122*i* denotes light-emission location information in which the location of a light emitting element turned on for informing a user of the location of the alien substance is stored. Reference numeral 122*j* denotes lamp lighting time information in which time period elapsed during the light emitting element being lit for informing the user of the location of the alien substance is stored.

The data and parameters below are temporary stored in the RAM 123 or 111 during execution of the above programs. Reference numeral 123*a* denotes a document feeder open/close flag storing whether a document feeder (a document feeder 201 or 202 in FIG. 2) is open or closed. Reference numeral 123*b* denotes a document presence/absence flag storing whether or not a document exists in the document feeder. Reference numeral 123*c* denotes the number of times of pushing a copy button storing how many times the copy button has been pushed without performing cleaning of an alien substance. Reference numeral 123*d* denotes a display message storing a message to be actually displayed based on the message format 122*f*. Reference numeral 123*e* denotes a timeout counter for counting timeout.

The RAM 123 is also used both as an image data storage area 123*f* and as a program load area 123*g*.

Based on the configuration of the apparatus described above, the phenomenon which the present invention deals with, and the operational flow, the hardware configuration and the control configuration according to the present embodiment will be sequentially described below.

Example of the Document Feeder

Figure 2:
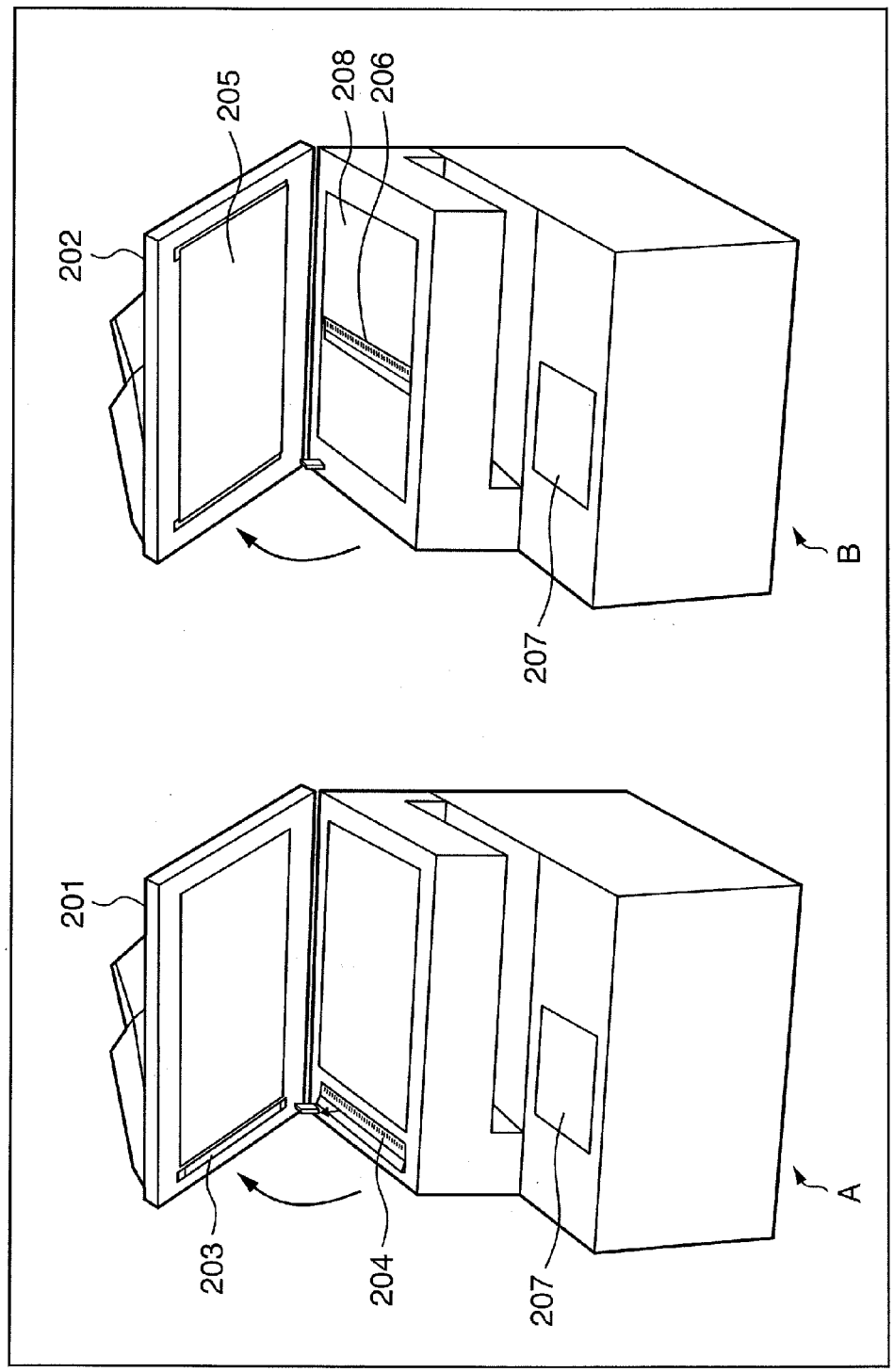
FIG. 2 is a comparative diagram for comparing image reading apparatuses to show difference in the scanning location due to difference in the structure of a document feeder.

FIG. 2 is a diagram showing an example indicating that the configuration and the location of feeding-document reading change depending on the type of a document feeder.

In FIG. 2, "A" shows the appearance of an image forming apparatus equipped with a roller-feeding type document feeder. Similarly, in FIG. 2, "B" shows the appearance of an image forming apparatus equipped with a belt-feeding type document feeder. In "A" of FIG. 2, a roller-feeding type document feeder 201 is provided with feeding-document reading glass 204 on the image reading apparatus side. At locations where a roller surface 203 can be read via the feeding-document reading glass 204, the light illumination unit, a mirror table unit (not shown), a condenser lens (not shown), the CCD 115 and the like are arranged.

Brief description will be made on an example of document feeding by a roller-feeding type document reading apparatus with reference to "A" of FIG. 3.

When documents are set on a document loading tray 301, it is detected by a document presence/absence detection sensor 325 that the documents are loaded. By pushing a copy button 337 on an operation panel 335 shown by "C" of FIG. 3, document feeding is started. Reference numeral 338 denotes a numeric keypad for setting the number of copies, and reference numeral 336 denotes a display unit.

With the start of feeding, the loaded documents are fed by a feed roller 302 sequentially from the top of the documents in a manner that feeding of overlapping documents is not caused. The document passes through a feeding path along the route indicated by reference numeral 306. Then, the document is guided by a roller (a feed assisting roller) 303 to a document scanning location 326 opposite to a feed roller 304. A light of an image reflected from a document is reflected three times by an optical reading system 328. The optical reading system 328 is configured by a first mirror table unit 312 equipped with a document illumination unit such as an LED array (not shown) and a first mirror, and a second mirror table unit (not shown) equipped with a second mirror and a third mirror. The light of an image is guided to the condenser lens (image forming lens), and then an image is formed on the CCD 115. That is, an optical image is converted to an electric image (video signal) with the optical reading system 328.

Reference numeral 329 denotes a control board of the image reading apparatus. In the case of the roller-feeding type image reading apparatus, the first mirror table unit 312 is moved to the lower position of feeding-document reading glass 305, and the surface of a document fed at a constant speed between the feed roller 304 and the feeding-document reading glass 305 is scanned. The scanned document is carried along a feed route denoted by reference numeral 307 and loaded in a document discharge unit 309. In the case of a both-side document, a reversal roller 310 is rotated in an opposite direction with the document caught by the reversal roller 310, and the document is sent to the feeding path again along a feed route denoted by reference numeral 308. Reference numeral 311 denotes a flapper kept in a condition that weak pressure is always applied toward the feeding path 307. A document fed from the feeding path 307 is sent with pushing up the flapper 311. On the contrary, when the document is sent to the feeding path again along the route 308, the document is supported by the flapper 311 so that it is not moved backward. By performing document feeding in this way, the both-side images of the document can be read by feeding-document scanning.

However, in the example shown here, documents set face-up are discharged facedown in the case of single-side reading. On the other hand, in the case of both-side documents, the documents are discharged face-up and sequentially loaded, and therefore, the order of the documents is different from that when they were set. In this example, an example of both-side reading is only shown, but description of the control and the configuration about the order of the documents will be omitted. If the documents pass through the reversing path again, they are discharged facedown. Reference numeral 327 denotes a switch for detecting the open/close state of the document feeder. It is commonly configured to digitally detect (with binary data) the open/close state based on the locational relation between a lever pressed in with a close operation of the document feeder and an optical device such as a photo interrupter, though it is not shown.

Next, description will be made on a document feeding method by an image reading apparatus equipped with a belt-feeding type document feeder. The apparatus is shown in "B" of FIG. 2. A belt-feeding type document feeder 202 feeds a document in the document loading unit on the document feeder onto original plate 208 of the image reading apparatus using a feeding belt 205. The document feeder of this type is characterized in capable of switching between document feeding for feeding-document reading and document feeding for fixed-document reading in which a document is fixed on original plate and document scanning is performed by controlling a first mirror table unit 206 to move at a constant speed. That is, since it is not necessary to provide the document reading glass 204 dedicated for reading feeding-document in this type, the width of the document reading apparatus in sub-scanning direction can be reduced.

Description will be made below on an example of the document feed method using the belt-feeding type document feeder with reference to "B" of FIG. 3.

When documents are set on a document loading tray 313, it is detected by a document presence/absence detection sensor 330 that the documents are loaded. By pushing the copy button 337 on the operation panel 335 shown in "C" of FIG. 3, document feeding is started. With the start of feeding, the loaded documents are fed by a feed roller 314 sequentially from the top of the documents in a manner that feeding of overlapping documents is not caused. The document passes through a feeding path along the route indicated by reference numeral 316. Then, the document is guided by a feeding belt 317 to a document scanning location 332. Reference numeral 318 denotes a first mirror table unit equipped with a document illumination unit such as an LED array (not shown), and a light reflected from document is reflected three times and read by the CCD 115 as an optical image via an image forming lens (condenser lens). That is, an optical image is converted to an electric image (video signal) with an optical reading system 333.

Reference numeral 334 denotes a control board of the image reading apparatus. In the case of the belt-feeding type image reading apparatus, the first mirror table unit 318 is moved to the feeding-document reading location 332 at the lower position of original plate 339, and the surface of a document fed at a constant speed between the feeding belt 317 and the original plate 339 is scanned. After scanning of the rear end of the document is completed, the feeding belt 317 is continuously rotated. The document is fed along a route denoted by reference numeral 321 by the feeding belt 317 and loaded in a document discharge unit 322. Here, if the document is a both-side document, the feeding belt 317 is reversely rotated to move the document backward immediately after the rear end of the document passes the document scanning location at which the first mirror table unit 318 stays. The document sent backward is sent to a reversing path along a route denoted by reference numeral 319 by a jump table 324 and a flapper 323. Then, the document fed by a roller (feed assisting roller) 315 is guided to the feeding belt 317 along a route 320 on the reversing path, and fed to the document scanning location 332 at a constant speed.

However, in the example shown here, documents set face-up are discharged facedown in the case of single-side reading. On the other hand, in the case of both-side documents, the documents are discharged face-up and sequentially loaded, and therefore, the order of the documents is different from that when they were set. In this example, an example of both-side reading is only shown, and description of the control and the configuration about the order of the documents will be omitted. If the documents pass through the reversing path again, they are discharged facedown.

Example of the Operation by the Image Reading Apparatus of this Embodiment

Next, in relation to the problem of a line-like image which has conventionally occurred in the document-feed-type (feeding-document reading type) scan method, description will be made on occurrence of a line-like image and a method for performing a cleaning work for the occurred line-like image, with reference to FIGS. 4 and 5.

Example of Occurrence of a Line-like Image

Figure 4:
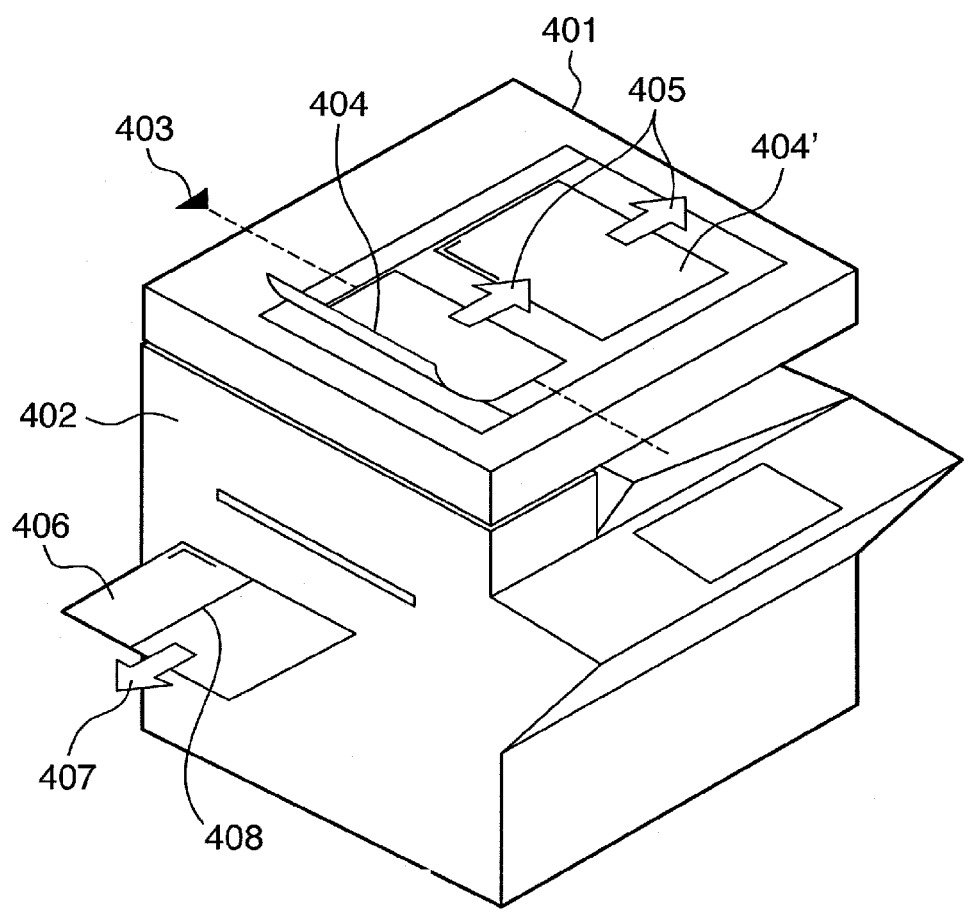
FIG. 4 is a diagram illustrating formation of a line-like image caused by an alien substance in the case of the belt-feeding type document feeder.

In FIG. 4, reference numeral 401 denotes an image reading apparatus, and reference numeral 402 denotes an image forming apparatus (printing apparatus). Documents (404 and 404') are fed in the direction of an arrow 405 by a document feeder not shown. The fed documents are scanned at a scanning location 403 of the image reading apparatus. If an alien substance exists on the scanning line shown at the scanning location 403, a line-like image 408 is formed on a printout image 406 outputted from the image forming apparatus in the direction of an arrow 407. As the factor of the line-like image 408, on the image reading apparatus side, factors such as paper dust, pencil lead powder, correction fluid and glue adhering at the feeding-document reading location are conceivable, while on the image forming apparatus side, factors such as airborne particles adhering to the cover glass on the laser-emitted light path are conceivable.

In this example, description will be made on a conventional original plate cleaning work performed in the case of the former factors, with reference to FIG. 5.

Figure 5:
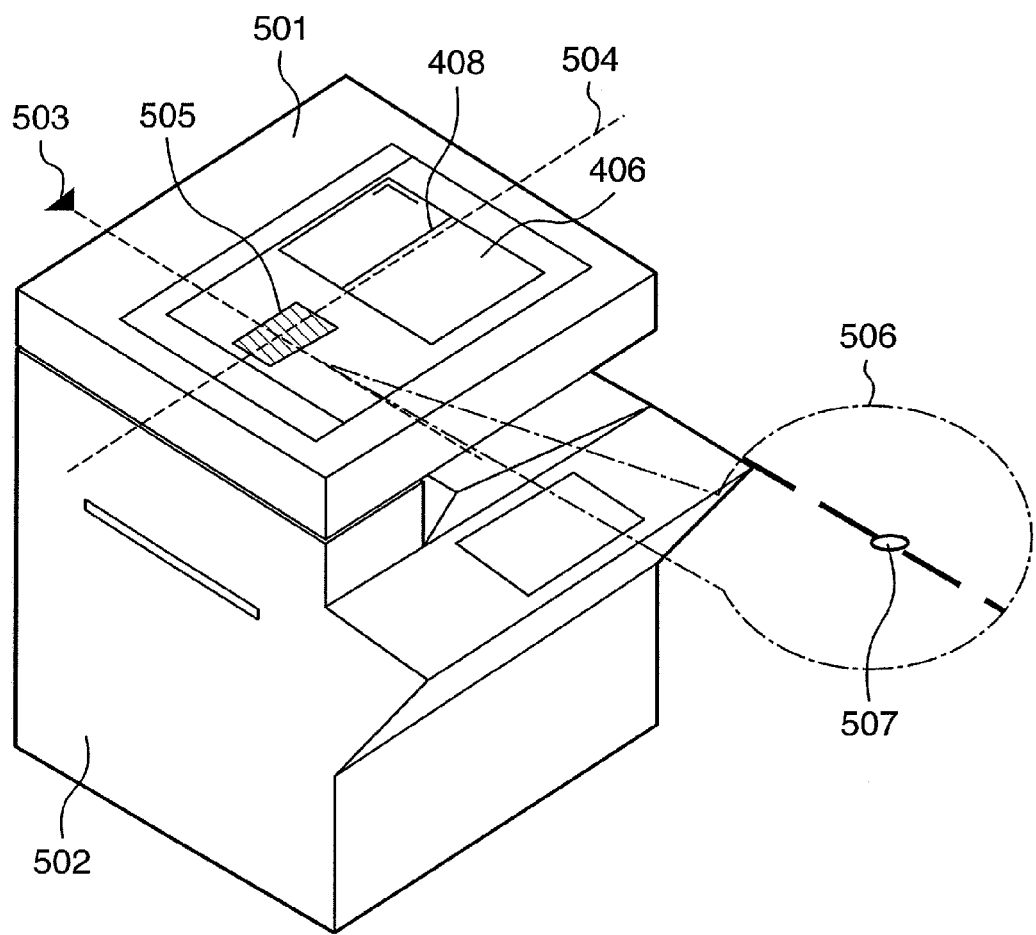
FIG. 5 is a diagram showing the situation of cleaning of an alien substance performed conventionally.

In FIG. 5, reference numeral 501 denotes an image reading apparatus, and reference numeral 502 denotes an image forming apparatus (a printing apparatus). Commonly, a user anticipates an alien substance adhesion area 505 on the document reading apparatus based on the line-like image 408 shown in FIG. 4. The adhesion area 505 is at a feeding-document reading location. However, since it is commonly during operation of document reading that a document reading unit stops at the feeding-document reading location, the user also anticipates the location of the adhesion area 505. In some models, the feeding-document reading location may be the initial location of a first mirror table unit. Since the roller-feeding type document reading apparatus is limited to use feeding-document reading glass, it is relatively easy to make anticipation.

As shown in a magnified FIG. 506 of an alien substance on the original plate, the alien substance is so small that visual check is difficult, and in most cases, it corresponds to approximately one pixel indicated by reference numeral 507. Therefore, a sample 406 having a line-like image is set on the original plate, and, based on an alien substance location 504 along the line-like image 408 and the feeding-document reading location 503, cleaning of the anticipated alien substance adhesion area 505 is performed. However, since this anticipated area is relatively large, and the alien substance is difficult to see (difficult to visually check), the degree of certainty of succeeding in removal of the alien substance is low, and it is often required to repeat cleaning of the original plate and image checking.

Example of Cleaning of a Line-like Image

In this embodiment, a configuration and a control method which enable cleaning of the surface of original plate to be performed in a short time are realized by focusing attention on the following points:

(1) To perform detection of an alien substance before starting document feeding and at an interval between documents during continuous document feeding;

(2) To improve the accuracy of cleaning by prioritizing cleaning of an alien substance and showing an alien substance location clearly to a user;

(3) To increase the visibility of an alien substance by lighting a backlight;

(4) To check the cleaning condition without printing out a line-like image output;

(5) To avoid using processing to process an original document image, such as image correction processing, as far as possible; and (6) To prompt cleaning of original plate after completion of a job when an original image has been processed.

Figure 6:
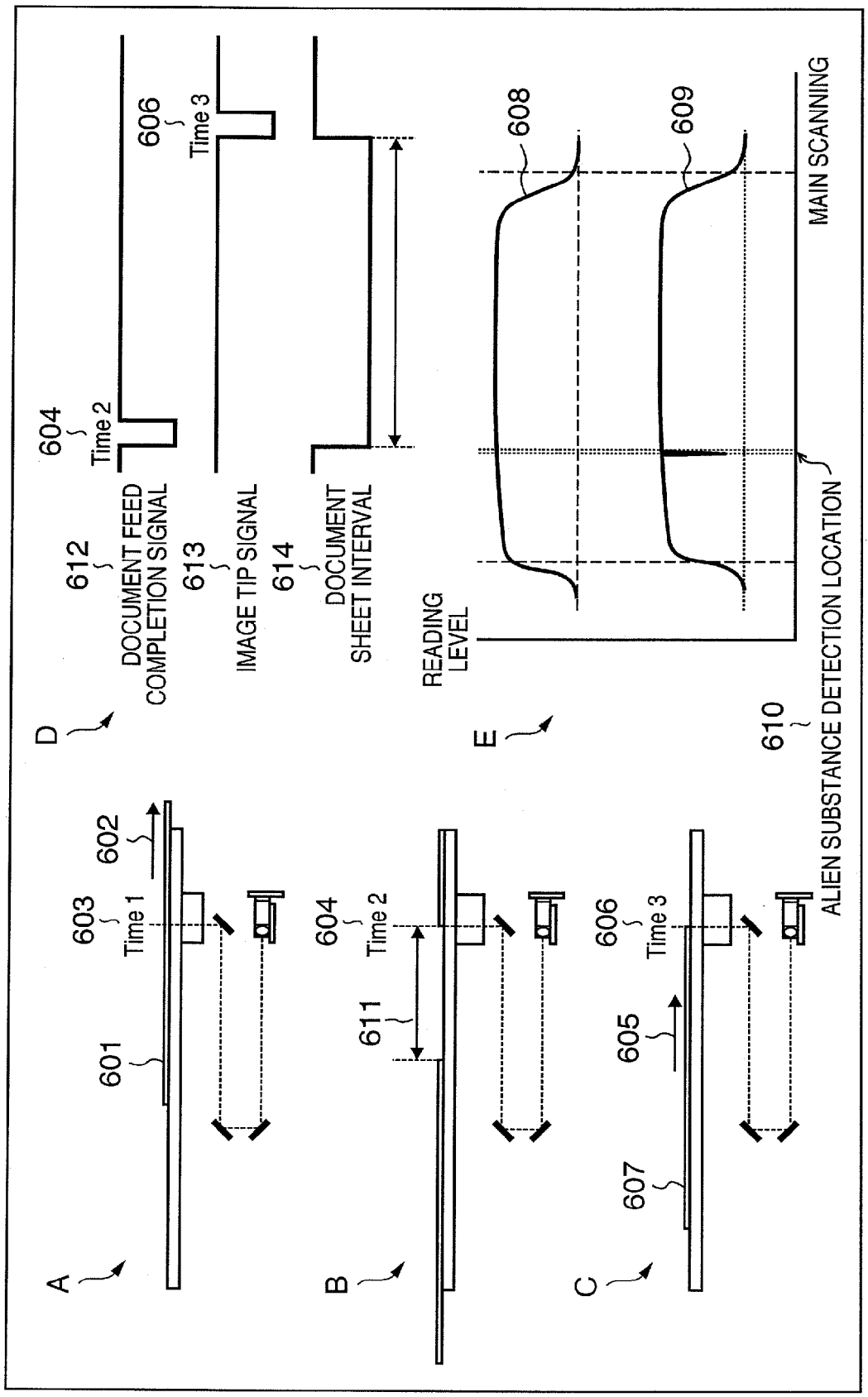
FIG. 6 is a diagram illustrating a method of detecting an alien substance based on a value read from a belt between documents continuously fed from a document feeder.

FIG. 6 shows timing of detecting an alien substance during a document reading job in this embodiment. "A", "B" and "C" of FIG. 6 indicate the condition of document feeding in a document reading apparatus according to elapsed time.

In FIG. 6, "A" shows that the image on a document 601 fed in the direction of an arrow 602 is being read. The image area at Time 1 (603) is being read. In FIG. 6, "B" shows Time 2 (604) when reading of the document 601, which was being read in "A" of FIG. 6, has been completed. At this time, a document feed completion signal 612 is outputted from the document feeder side, as shown in "D" of FIG. 6. In FIG. 6, "C" shows Time 3 (606) when the next document 607 is fed in a direction 605, and the image tip of the document has been read. In the case of reading feeding-document, an image tip signal 613 is outputted from the document feeder side.

A document sheet interval signal 614 is generated from the document feed completion signal 612 and the image tip signal 613 in "D" of FIG. 6 (they can be generated by a simple logical circuit such as a JK flip-flop circuit). This interval corresponds to a sheet interval 611 between the document 601 and the document 607 shown in "B" of FIG. 6.

The alien substance detection processing during document feeding determines and executes the following operations:

(1) To perform the processing at the document sheet interval 611 and stop the apparatus to perform cleaning;

(2) To switch to the fixed-document reading mode; or (3) To switch to document reading in the image correction mode, and prompt cleaning of an alien substance on the original plate after completion of the job.

In FIG. 6, "E" shows a reading condition 608 in which no alien substance has been detected at the document sheet interval 611, and a reading condition 609 in which an alien substance has been detected at an alien substance detection location 610. During the alien substance detection performed when documents are set in the document feeder before start of a job also, detection of an alien substance is similarly performed from values read from the belt and the roller, though it is not shown.

Figure 7:
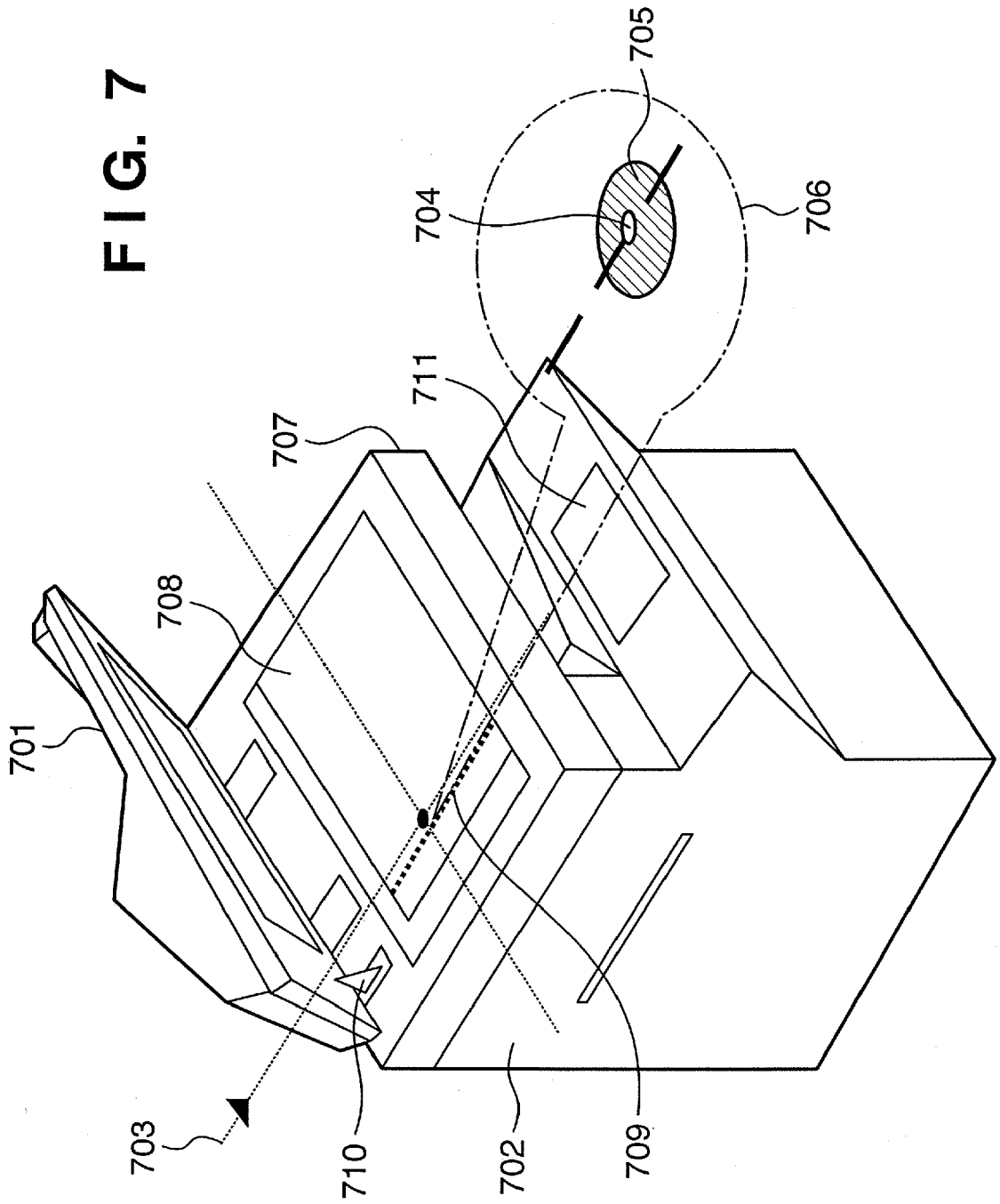
FIG. 7 is a diagram illustrating a method of showing an alien substance location of this embodiment.

FIG. 7 is a diagram showing the operation condition of this embodiment based on the result of the alien substance detection shown in FIG. 6. Description will be made on the operation of an alien substance display unit on the assumption that detection of an alien substance has already ended.

When an alien substance is detected, a message is displayed on a display unit 711 which prompts cleaning of an area on the original plate where the alien substance is shown. Soft keys (not shown) enabling input and setting of a document reading mode, a priority condition and the like are also displayed. The document reading mode stated here means setting for document reading, that is, setting of the feeding-document reading mode or the fixed-document reading mode, and setting about whether line-like image correction process is to be performed or not. The priority condition is for selecting whether productivity or image quality is to be given priority. By setting these conditions in advance, for example, in the case of desiring an image without a line-like image even if correction of the document is required, it is possible to automatically switch reading mode from the feeding-document reading mode to the fixed-document reading mode with taking into account of the priority of image quality, when an alien substance is detected.

When seeing the cleaning message, a user (not shown) opens a document feeder 701 to perform a cleaning work. When the document feeder is opened, a pressure plate detection lever 710 is turned-off state. An image reading apparatus 707 recognizes that the document feeder is open, selects an optimum light emitting element from multiple light emitting elements constituting a document illumination unit 709, and controls illumination on an alien substance location 705 around an alien substance 704 adhering to original plate 708 on a document reading location 703. Reference numeral 706 denotes a magnification display of the alien substance location on the original plate. Reference numeral 702 denotes an image forming apparatus (a print apparatus).

Example of the Procedure for the Processing by the Image Reading Apparatus of this Embodiment In this embodiment, control of operation differs according to the types (the roller-feeding type and the belt-feeding type) of the document feeder. An example of the procedure for operation by the image reading apparatus will be described in accordance with flowcharts in FIGS. 8A to 8C and in FIGS. 9A to 9D.

Figure 8A:
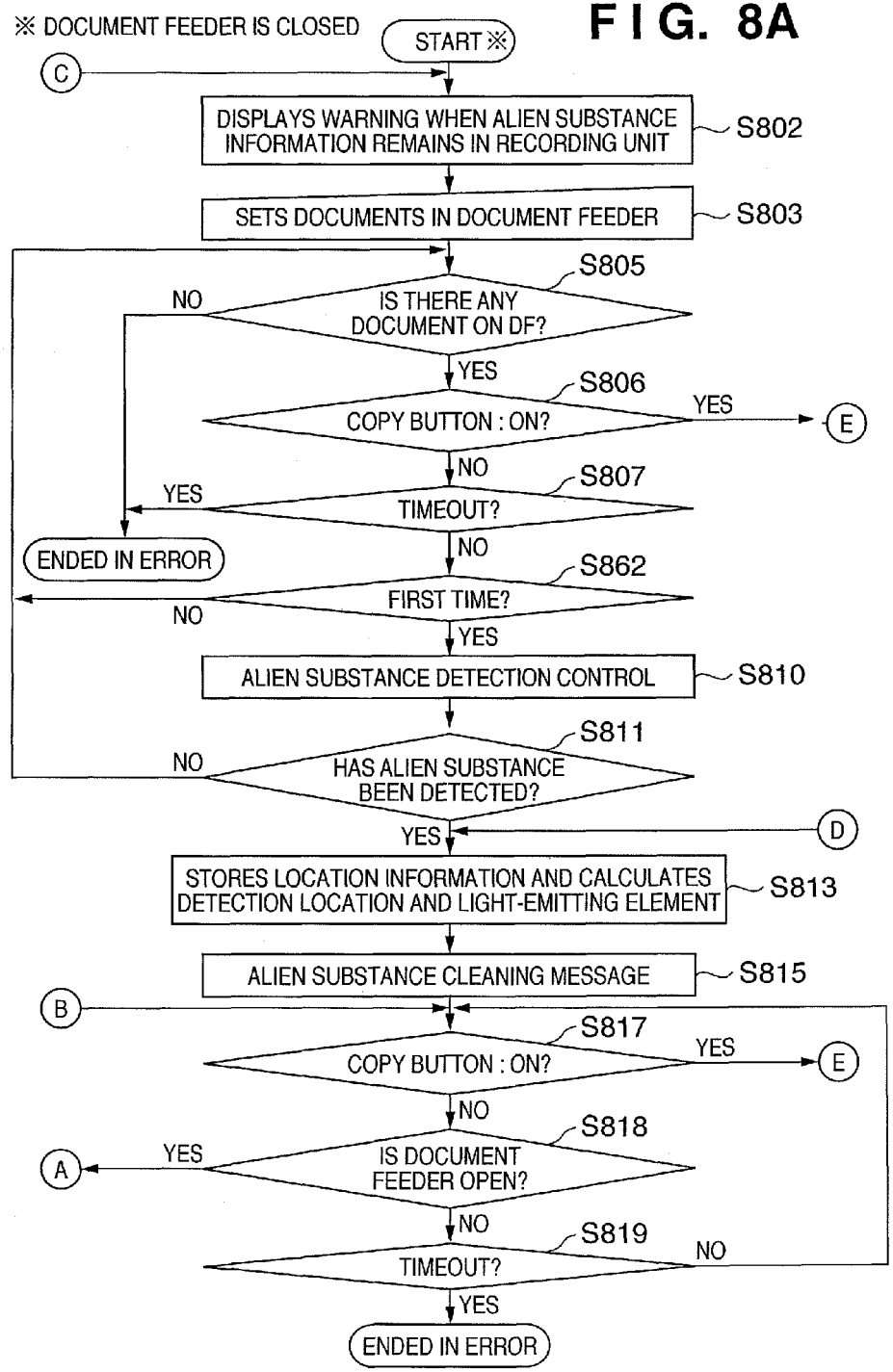
FIGS. 8A to 8C are control flowcharts in an image reading apparatus equipped with a roller-feeding type document feeder.
Figure 8B:
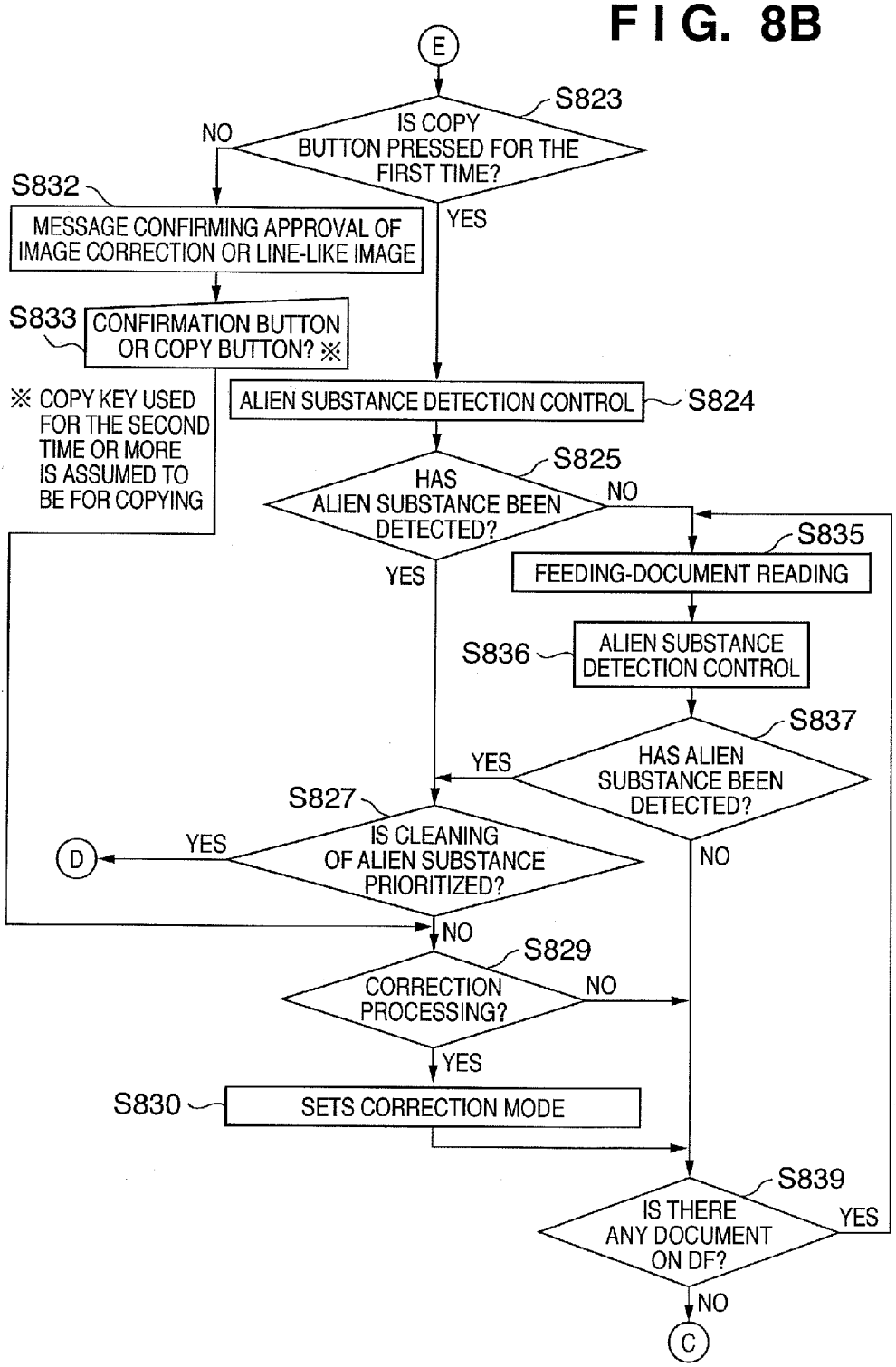
Figure 8C:
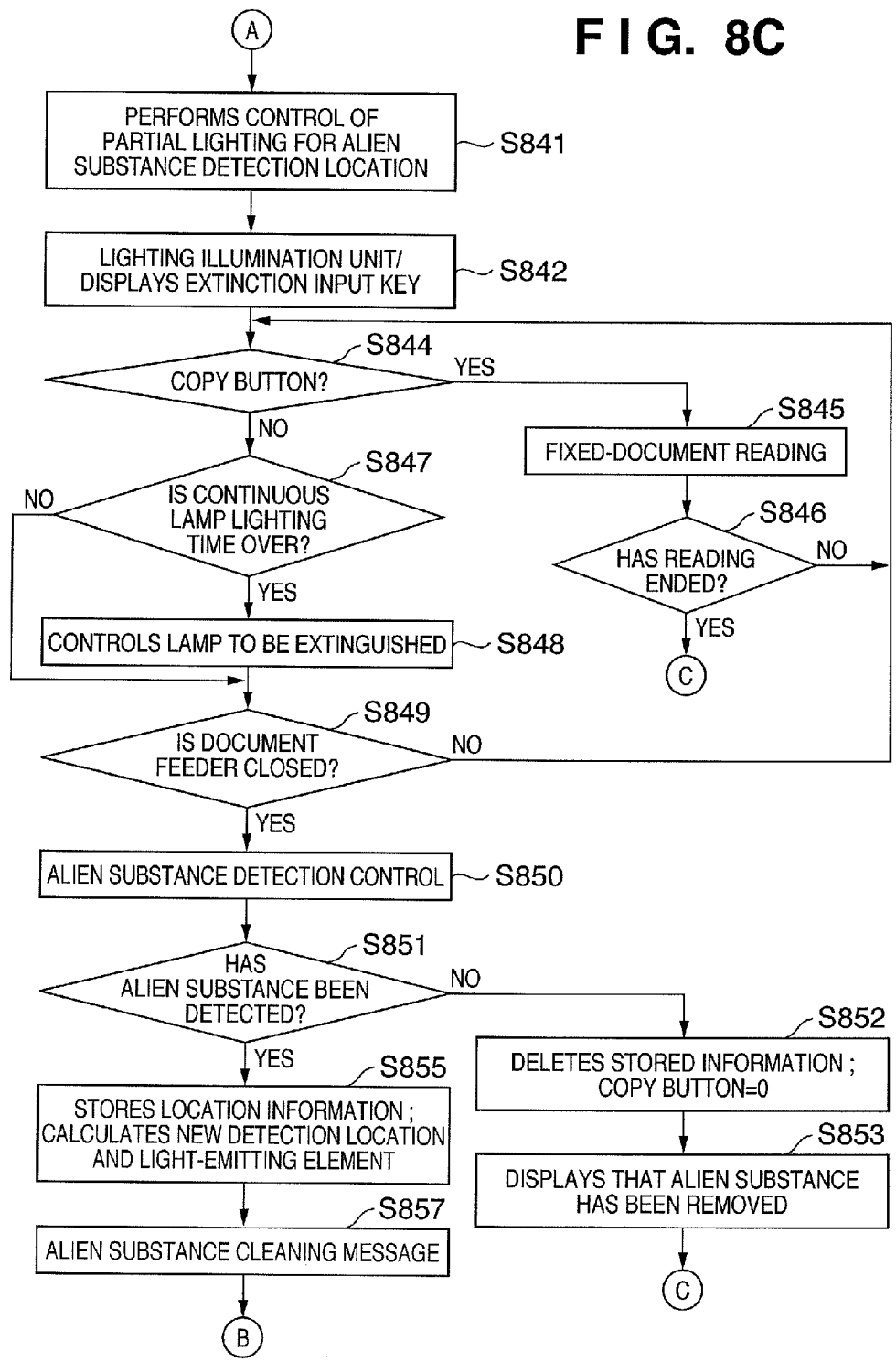

Example of the Procedure in the Case of the Roller-feeding Type: FIGS. 8A to 8C An image reading apparatus equipped with a roller-feeding type document feeder can be indicated by an apparatus of the type shown in "A" of FIG. 2. As for the configuration of the apparatus, "A" of FIG. 3 will be referred to and the description of the flowchart below will be supplemented with description with reference to "A" of FIG. 3 as required. The control starts while the document feeder is closed as the initial state.

If an alien substance was detected on original plate (not shown) while a previous job was being performed, but a user neglected removal (cleaning) of the alien substance, then, in this control starting state, a message that the alien substance was detected and a message prompting cleaning are displayed on the display unit 207 to inform that the user, based on alien substance data stored in the RAM 123 or the EEPROM 122 (S802). A flowchart of a plate cleaning mode in this situation will be shown in FIGS. 10A and 10B, and description thereof will be made later.

Description from step S803 will be made below on the assumption that an alien substance was not detected during the previous job. When a user (not shown) sets documents on the document loading tray 301 of the document feeder, the presence/absence of a document is detected by the document presence/absence detection sensor 325 on the document feeder (S805). That is, with the fact that documents are set in the document feeder as a trigger, actual control of the image reading apparatus is started. However, though setting of documents is used as a trigger in the flowcharts shown in FIG. 8A, the same function is also performed by using the copy button as a trigger. In this case, presence/absence of a document is detected when the copy button is pushed, and then the alien substance detection processing is started (the flowchart for the synchronization with the copy button will be simpler).

In this case, if the documents are removed immediately, then the result of judgment on the presence/absence of the documents 301 on the document feeder (S805) is "NO", and the job ends. If documents are set at step S805, then presence of documents is judged, and the sequence proceeds to judgment on whether or not the copy button 337 has been pushed (S806). If it is judged at step S806 that the copy button has not been pushed, then the sequence proceeds to judgment of timeout (S807). If the copy button is not pushed within a predetermined time period after the documents are set, then timeout operation is performed to cause the image reading apparatus to transition to a standby state, and the control flow ends.

If it is judged that timeout is not detected, then it is judged whether this is the first-time copy button waiting routine (S862). If it is the second time or more, then the sequence returns to step S805. Therefore, the flow described above is repeated until it is detected that the copy button is turned on at step S806 or timeout is judged at step S807 after presence of documents is judged at step S805. If it is the first-time copy button waiting routine at step S862, then the sequence proceeds to step S810 and performs control of alien substance detection.

That is, detection of an alien substance is performed by executing control of feed roller rotation for reducing the influence of dirt of the feed roller 304 itself, control of lighting of a document illumination unit (not shown) arranged on the first mirror table unit 312, and clock drive control of a CCD and a peripheral driving control unit (not shown) arranged in the optical reading system 328. When the alien substance detection is performed within a predetermined time, and judgment on presence/absence of an alien substance ends, the sequence branches at step S811 based on the result of the judgment. In this example, if an alien substance is not detected, the sequence returns to step S805 and goes to a copy button waiting state.

On the other hand, if an alien substance is detected as a result of the judgment of S811, then, at step S813, one or more pixel on the CCD at which an alien substance is detected is selected, and one or more corresponding element for illuminating and showing the detected alien substance on the feeding-document reading glass 305 is selected from multiple elements constituting the document illumination unit (not shown). At the same time, location information about the alien substance is stored. After that, at step S815, the result of the detection of the alien substance and a message prompting cleaning of the alien substance are displayed on the display unit 336.

The display unit 336 is configured so that a touch panel (not shown) for accepting a key input by a user is overlapped thereon. By pushing button shown on the display unit, a key input corresponding to coordinates of the button is accepted. After the alien substance cleaning message is displayed, the sequence proceeds to judgment on the push of the copy button again (S817). Here, if it is judged that the copy button is not pushed, and the document feeder is not opened for a predetermined time, then timeout is judged, and the sequence ends (S817=>S818=>YES at S819). If there is still time before timeout as a result of the timeout judgment (S819), then the sequence returns to step S817 and goes to the copy button waiting state again.

Next, description will be made on a flow in the case where the document feeder is opened after the alien substance cleaning message is displayed on the display unit (YES at S818=>A in FIG. 8C).

In synchronization with the document feeder being opened at step S818, control of partial lighting for the alien substance detection location is executed (S841). That is, if the first mirror table unit 312 does not exist at the document scanning location 326, control is performed to drive an optical motor (not shown) to the document feeding location and stop it there. At the same time, control is performed to light only a document illumination element (not shown) for illuminating the location of the alien substance on the surface of the feeding-document reading glass 305. At the same time, the alien substance illumination unit performs timer processing as shown at step S847 described below. Soft keys enabling a user to freely perform lighting/extinction control are also displayed (S842). This measure is taken in consideration of enabling the empirical way of coping, that is, emission of light from the opposite side of the glass to increase the visibility of an alien substance, to be always controlled irrespective of the timer processing, and the measure is intended to reduce the burden on the user's eyes by the whole lighting of the document illumination unit.

The flow at or after step S844 indicates that cleaning of an alien substance is being performed. However, there may be a case that, when the alien substance cleaning display is shown, a user changes the mode from the feeding-document reading mode to the fixed-document reading mode without performing cleaning of the alien substance. That is, if a document is set on original plate 340, and the copy button 337 is pushed, a document image can be read in the fixed-document reading mode in which the document is scanned by the first mirror table unit 312 (S844=>S845=>S846). In the case of continuing the processing in the fixed-document reading mode, the sequence returns from judgment of end of reading (S846) to the copy button waiting state (S844). When the fixed-document reading ends, the sequence returns to processing for the next document (S846=>S802).

If it is judged (S844) that the copy button has not been pushed, the sequence proceeds to a timer flow for lamp lighting time (S847 and S848). If the document feeder is not closed (S849), control to extinguish the lamp is performed at step S848 after the lamp is continuously lit for a predetermined time or more (for example, three minutes). If the document feeder is closed, then the open/close state detection switch 327 of the document feeder is pressed in, and a close state is detected. Then, alien substance detection control (S850) is performed. If an alien substance is not detected here, then stored information in which the location of an alien substance is stored is erased, and the number of times about the copy button is initialized to zero. Then, a message to the effect that the alien substance has been removed is shown on the display unit 336, and the alien substance removal sequence ends (S851=>S852=>S853=>S802).

On the other hand, if an alien substance is detected at step S851, then a document illumination element for illuminating a pixel at which the alien substance is newly detected and the surface of the feeding-document reading glass is selected. At the same time, old alien substance location information is erased, and new alien substance location information is stored (S851 and S855). Furthermore, the alien substance cleaning message is displayed on the display unit 336 (S857) to prompt cleaning of the glass surface again. After that, the sequence moves to step S817 (FIG. 8A) and repeats the sequence of the alien substance cleaning mode again.

Next, processing to be performed when the copy button is pushed at step S806 or S817 will be shown by a flowchart. It is detected that the copy button has been pushed at both of steps S806 and S817. However, an alien substance has not been detected at step S806, and an alien substance has been detected at step S817.

When the sequence comes to step S823 from step S806 or S817, the copy button has been pushed for the first time. Therefore, "YES" is selected as a result of judgment whether the number of times of the copy button having been pushed is once or not (S823), and alien substance detection control (S824) is performed. At judgment on the result of alien substance detection (S825), a sequence corresponding to the judgment on the push of the copy button at the S806 or S817 is selected. If the copy button has been pushed at step S806, feeding-document reading is executed because an alien substance has not been detected (S825=>S835). At the same time, alien substance detection control (S836) is also performed. At an interval between documents which are continuously fed from the document feeder, the roller surface density of the feed roller 304 is read. If an alien substance is not detected, feeding-document reading control is performed while any loaded document 301 of the document feeder exists (S837=>S839=>S835). If there is not a loaded document any more, then the document reading control ends (S839=>S802).

On the other hand, if an alien substance is detected during feeding-document reading (YES at S837) or if the copy button has been pushed when an alien substance exists (YES at S825), then the sequence proceeds to judgment on whether the mode for prioritizing alien substance cleaning is set (S827). Though the priority of alien substance cleaning can be set from the display unit during a job being performed, it is normally to be set in a user mode (not shown) so that a user registers it with the image forming apparatus in advance. The setting is stored in a non-volatile memory such as the EEPROM 122.

If priority of image quality (priority of alien substance cleaning) is set, the location of an alien substance is detected, and the alien substance information is updated (S813). Then, in the predetermined procedure described above, the document feeder is opened to perform cleaning of the alien substance. On the other hand, if the priority of image quality (priority of alien substance cleaning) is not set at step S827, then the sequence proceeds to judgment on the execution of correction processing (S829). Here, the correction processing is a function of correcting a line-like image caused due to an alien substance by image processing. The correction processing is also configured in a manner that it can be set from the display unit during a job being performed. It is normally to be set in the user mode (not shown) so that a user registers it with the image forming apparatus in advance. The setting is stored in a non-volatile memory such as the EEPROM 122. When the image correction mode is selected at step S829, then setting of the correction mode (S830) is performed. If the image correction mode is not selected, then the sequence proceeds to step S839 with the image correction mode set as "passing through". Then, feeding-document reading accompanied by image correction is performed through steps (S839=>S835=>S836=>S837=>YES at S829).

If the copy button has been pushed twice or more (NO) at step S823, then a confirmation message about whether image correction or acceptance of a line-like image is to be approved is displayed on the display unit 207 (S832). A confirmation button indicating confirmation or the copy button is selected, then the sequence proceeds to step S829 and executes feeding-document reading. The case where the copy button has been pushed twice or more corresponds to the case where the copy button is further selected without performing cleaning processing (FIG. 8C) for removal of an alien substance (if the cleaning processing for removal of an alien substance succeeds, the number of times the copy button has been pushed is initialized to zero).

Finally, when there is not a document loaded on the document feeder any more (NO at S839), the document reading job ends, and the sequence returns to step S802. In this flow, a step of releasing the correction mode after starting the job is not described, which is to be performed, for example, in the case where an alien substance is detected before starting a feeding-document reading job, but it becomes impossible to detect the alien substance during the job. However, the image correction mode may be released when an alien substance is not detected. The productivity does not change because image reading is performed by the feeding-document reading. The correction mode may be released when the feeding-document reading in the correction mode ends. Alternatively, it is also possible to, when the sequence returns to step S802, display that the mode is the correction mode and prompt the user to make judgment (on whether to continue the feeding-document reading or to reset the correction mode and remove the alien substance).

Example of the Procedure in the Case of the Belt-feeding Type: FIGS. 9A to 9D

Next, description will be made on an operational flow of an image reading apparatus equipped with a belt-feeding type document feeder. The apparatus can be indicated by an apparatus of the type shown in "B" of FIG. 2. By referring to "B" of FIG. 3, the apparatus configuration diagram, the description of the flowchart below will be supplemented with description using "B" of FIG. 3 as required. The control starts while the document feeder is closed as the initial state.

In this control start state, if an alien substance was detected on original plate (not shown) in a previous job, and a user neglected removal (cleaning) of the alien substance, a message that the alien substance has been detected and a message prompting cleaning are displayed on the display unit 207 based on alien substance data stored in the RAM 123 or the EEPROM 122 (S902). A flowchart of the plate cleaning mode in this situation will be shown in FIGS. 10A and 10B. Description thereof will be made later. Now, description will be made below from step S903 on the assumption that an alien substance was not detected during the previous job.

When a user (not shown) sets documents on the document loading tray 313 of the document feeder (S903), presence/absence of a document is detected by the document presence/absence detection sensor 330 on the document feeder (S905). That is, with the fact that documents are set in the document feeder as a trigger, actual control of the image reading apparatus is started. In the flowcharts shown in FIG. 9A, setting of documents is used as a trigger. However, the same function is also performed by, with the use of the copy button as a trigger, detecting presence/absence of a document when the copy button is pushed, and then starting the alien substance detection processing. The flowchart for the synchronization with the copy button will be simpler. In this case, if the documents are removed immediately, then the result of the presence/absence judgment of the documents in the document loading tray 313 on the document feeder (S905) is "NO", and the job ends.

On the other hand, if documents are set at step S905, then it is judged that documents exist, and the sequence proceeds to judgment on whether or not the copy button 337 has been pushed (S906). If it is judged at step S906 that the copy button has not been pushed, then the sequence proceeds to judgment on timeout (S907). If the copy button is not pushed within a predetermined time period after the documents are set, then timeout is performed to cause the image reading apparatus to transition to a standby state, and the control flow ends. If it is judged that timeout is not to be performed, then it is judged whether this is the first-time copy button waiting routine (S910). If it is the second time or more, then the sequence returns to step S905. Therefore, the flow described above is repeated until it is detected that the copy button is turned on at step S906 or timeout is judged at step S907 after presence of documents is judged at step S905.

In the case of the first-time copy button waiting routine, as a result of judgment at step S910, the sequence proceeds to step S911 and alien substance detection control is performed. That is, by executing feeding belt rotation control for reducing the influence of dirt of the feeding belt 317 itself, light control of lighting of the document illumination unit (not shown) arranged on the first mirror table unit 318, and clock drive control of a CCD and a peripheral driving control unit (not shown) arranged in the optical reading system 333, detection of an alien substance is performed. When the alien substance detection is performed within a predetermined time, and then judgment on presence/absence of an alien substance ends, the following flow is determined based on the result of the judgment (S912). In this example, the sequence returns to step S905 so that the state changes to the copy button waiting state if an alien substance has not been detected.

On the other hand, if an alien substance is detected as a result of the judgment of S912, then, at step S915, one or more pixel on the CCD 115 at which an alien substance is detected is selected, and one or more corresponding element for illuminating and showing the detected alien substance on the original plate 339 is selected from multiple elements constituting the document illumination unit (not shown). At the same time information about the location of the alien substance is stored (S916). After that, the result of the detection of the alien substance and a message prompting cleaning of the alien substance are displayed on the display unit 336 at step S917. In this case, the display unit 336 is configured so that a touch panel (not shown) for accepting a key input by a user is overlapped thereon. By pushing a button shown on the display unit 336, a key input corresponding to coordinates of the button is accepted.

Figure 3:
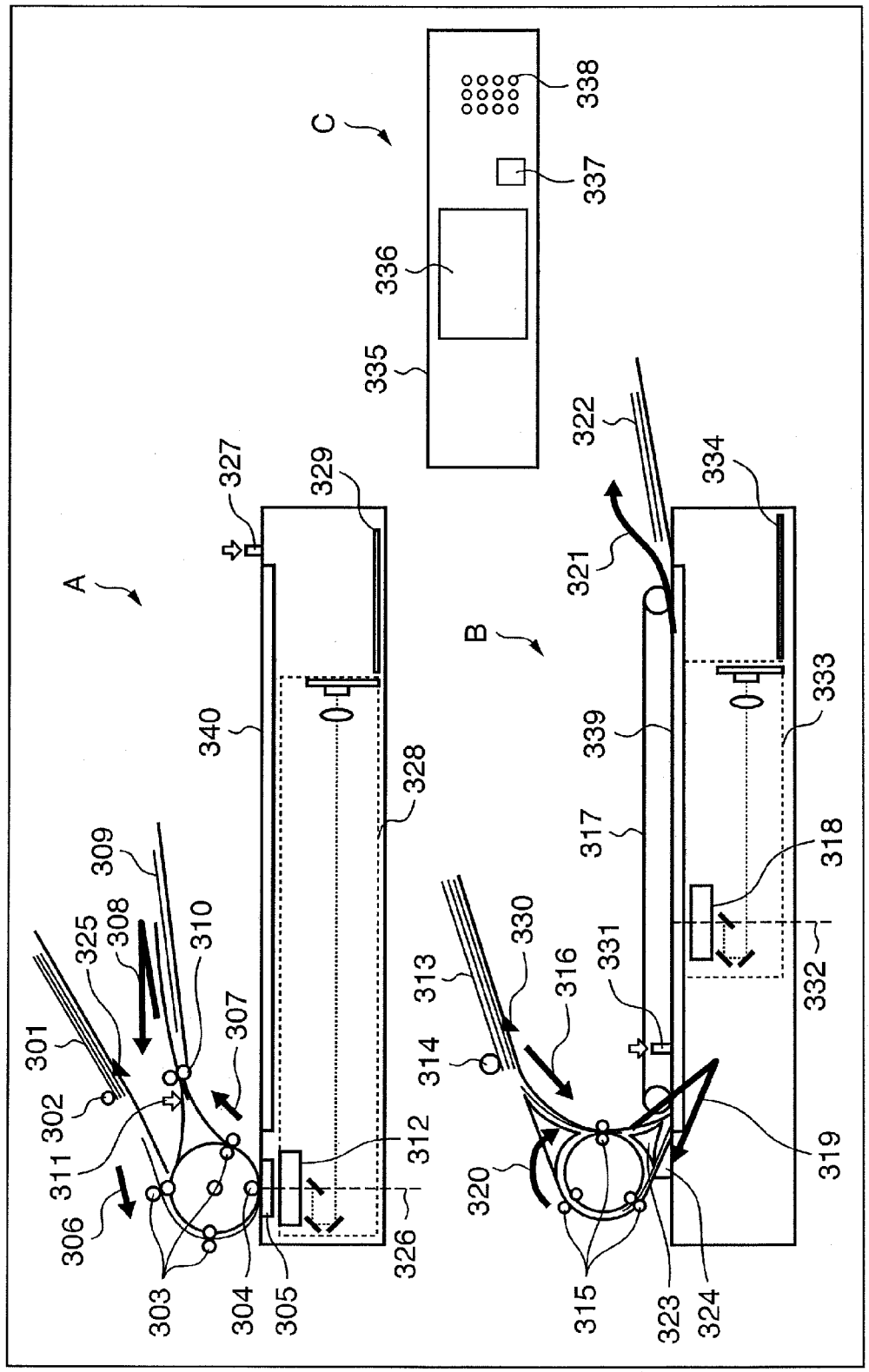
FIG. 3 is a diagram illustrating document feed control by a roller-feeding type document feeder or by a belt-feeding type document feeder.

The configuration in "B" of FIG. 3 is that of a belt-feeding type apparatus. In addition to the feeding-document reading, in which documents are scanned by the fixed first mirror table unit 318 while they are being fed from the document feeder in which they are set, the fixed-document reading is also possible in which a document is fed onto the original plate 339, and the document fixed on the original plate 339 is scanned by the first mirror table unit 318 controlled to move at a constant speed. Judgment on setting for avoiding a line-like image is performed as means for switching between the two scanning types (S918). In this judgment, "YES" indicates switching to the flow of the fixed-document reading, and "NO" indicates switching to the flow of the alien substance cleaning mode.

If the fixed-document reading is set at step S918, then the sequence proceeds to the judgment on the push of the copy button (S921) again. If the copy button is not pushed, and a key operation is not performed by a user within a predetermined time, "YES" is judged at the timeout judgment (S928), and the sequence ends. If the time is still before the time of timeout, then the apparatus goes to the copy button waiting state again. If the copy button has been pushed at step S921, then judgment on presence/absence of documents set on a document feeder 922 is performed (S922). If it is judged that documents are not set, then a message prompting setting of documents is displayed on the display unit 336 (S923), and the sequence ends. If documents are set on the document feeder at step S922, then fixed-scan reading is started (S925). While documents exist as a result of the judgment on presence/absence of the documents set on the document feeder (S926), steps S926 and S925 are repeated. When no document is detected at step S926, then the document reading ends.

Next, description will be made on a sequence performed in the case where the copy button is pushed at step S906 when no alien substance has been detected. When the copy button is pushed, feeding-document reading is started (S931). When the feeding-document reading is started, alien substance detection control is also performed at the same time (S932). At an interval between documents, detection of an alien substance on the original plate is performed. If an alien substance is detected as a result of the alien substance detection judgment (S933), the sequence proceeds to detection of the location of the alien substance (S915). In the case where there is no alien substance, if there is a document as a result of the judgment on presence/absence of documents set on the document feeder (S934), then the sequence returns to step S931, and sequentially reads the documents. When it is judged at step S934 that there is not a document any more, the sequence ends.

Next, description will be made on a flowchart of alien substance cleaning in the case where "NO" is selected as a result of the judgment on avoidance of a line-like image (S918), that is, in the case of giving priority to productivity of document reading (a speed of reading documents).

Figure 9A:
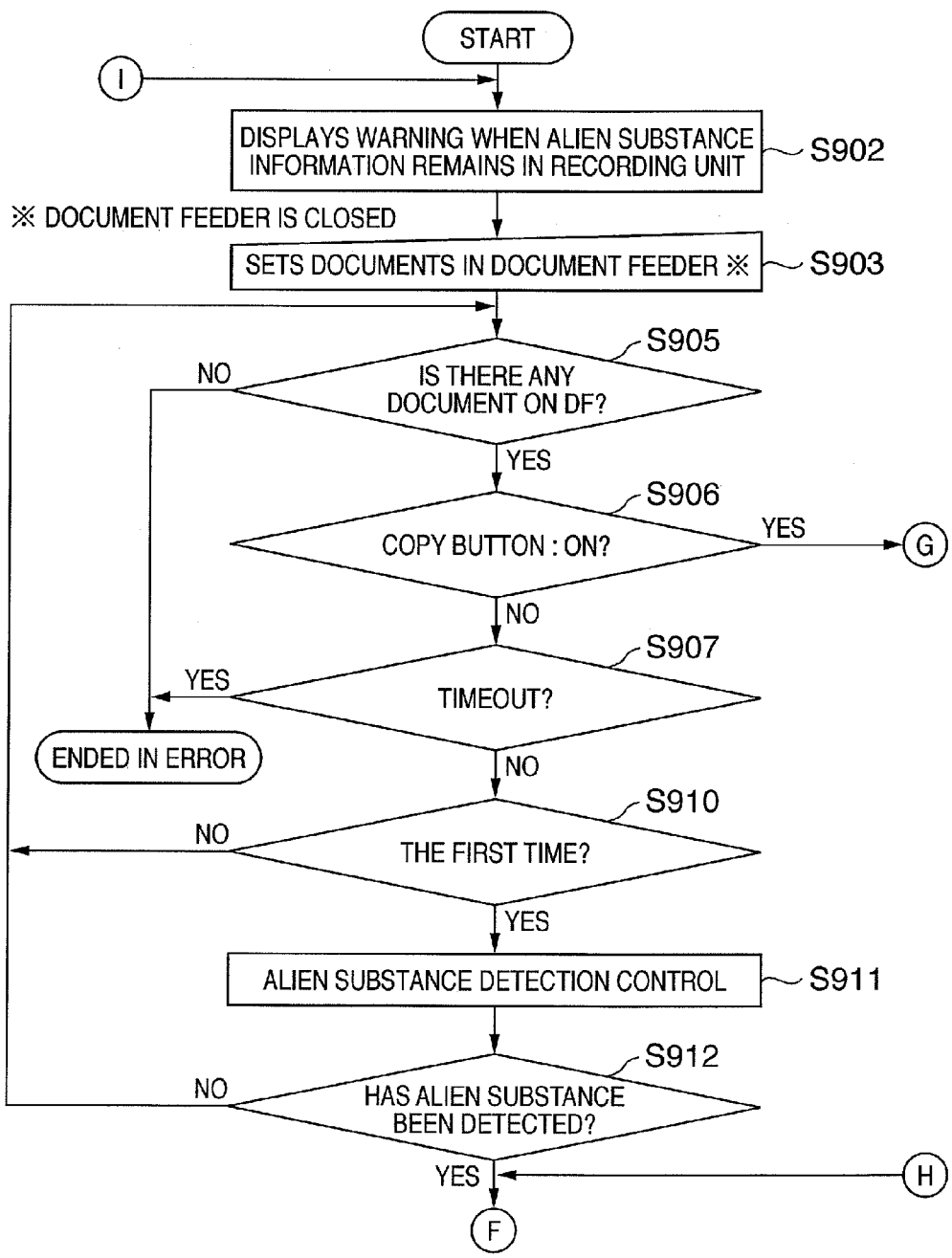
Figure 9B:
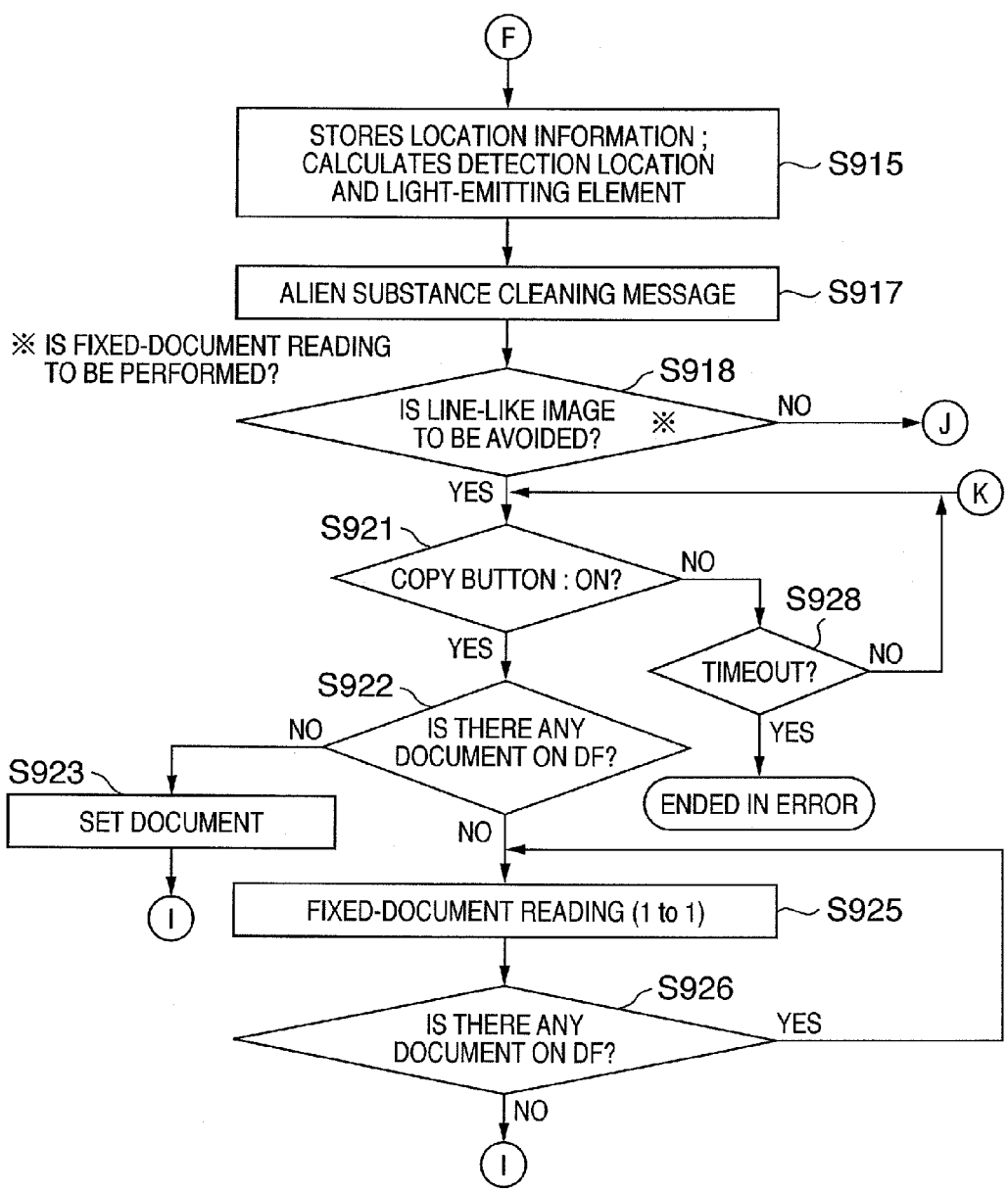
Figure 9D:
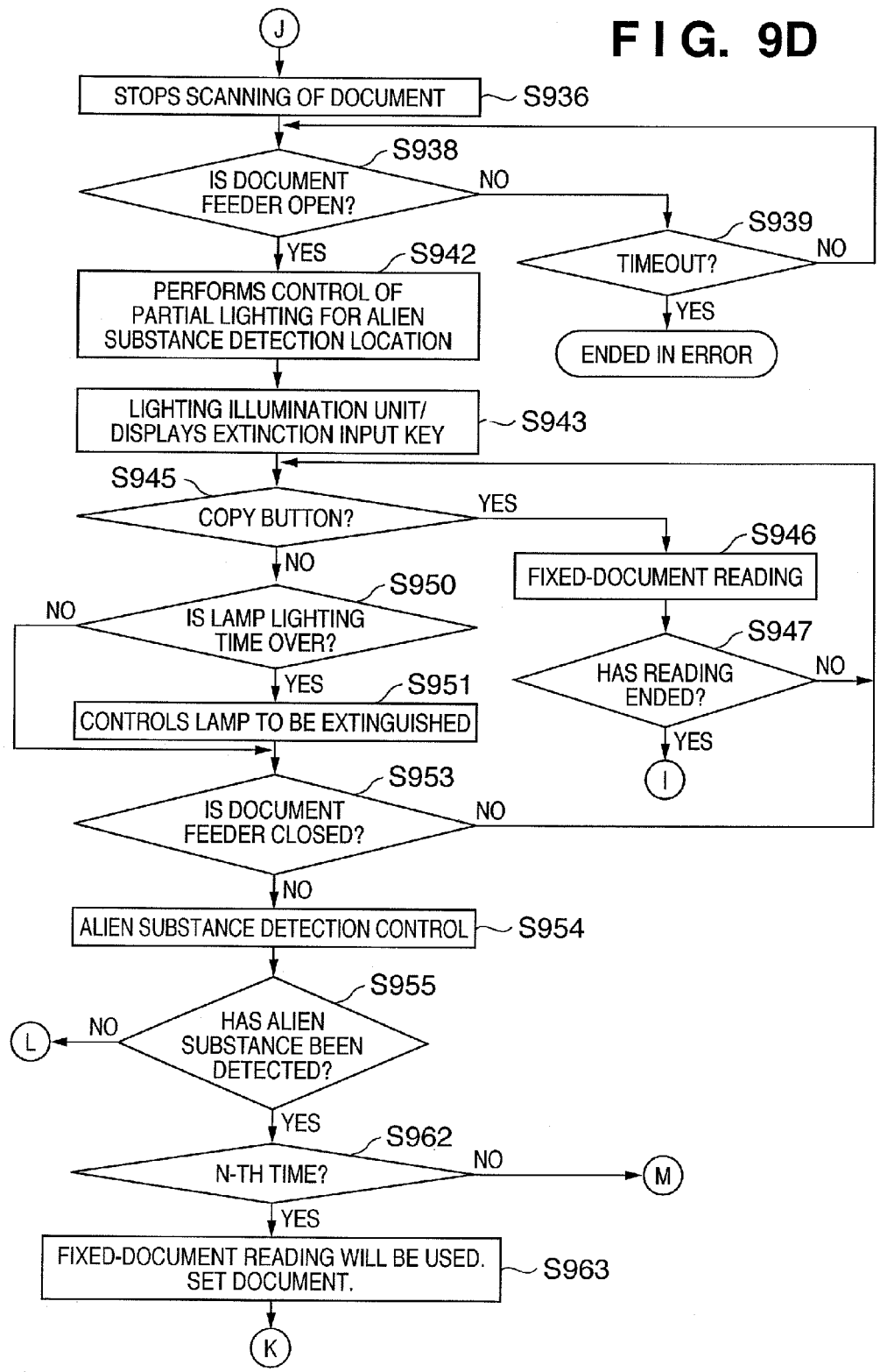

After step S918, control of the feeding-document reading is stopped by termination of document scanning (S936) in FIG. 9D. While the control is stopped, the result of detection of an alien substance and a message prompting cleaning of the original plate are displayed on the display unit 336 of the image reading apparatus. Next, the sequence proceeds to judgment on the open/close state of the document feeder (S938). If the document feeder is not opened at step S938, the sequence proceeds to timeout judgment (S939). If an operation of opening the document feeder is not performed within a predetermined time, then the control ends. If the time is before timeout at step S939, then the sequence returns to the judgment on the open/close state of the document feeder (S938). If it is judged at the judgment on the open/close state of the document feeder (S938) that the document feeder is opened, then partial Illumination by a light source (not shown) is applied to an alien substance location on the original plate 339 at the document scanning location 332, under the control of partial lighting for the alien substance detection location (S942) to show the alien substance location (cleaning location). On the display unit 336, lighting/extinction control keys for the document illumination unit of the illumination unit are displayed as soft keys (S943).

The flow at or after step S945 described below indicates that cleaning of an alien substance is being performed. However, when the alien substance cleaning message is displayed, some operators may change the mode from the feeding-document reading to the fixed-document reading without performing cleaning of the alien substance. That is, if a document is set on the original plate 339, and the copy button 337 is pushed, a document image can be read in the fixed-document reading mode in which the document is scanned by the first mirror table unit 318 (S945=>S946=>S947). In the case of continuing the processing in this fixed-document reading mode, the sequence returns from judgment on end of reading (S947) to the copy button waiting state (S945).

If it is judged at the judgment on the push of the copy button (S945) that the copy button has not been pushed, then the sequence proceeds to a timer flow for lump illumination time (S950 and S951). If the document feeder is not closed, lamp extinction control (S951) is performed after continuous lighting for a predetermined time or more (for example, three minutes). If the document feeder is closed, then an open/close state detection switch 331 for the document feeder is pressed in, and a close state is detected. Then, alien substance detection control (S954) is performed. Here, if an alien substance is not detected as a result of the alien substance detection judgment (S955), stored information about the alien substance location is erased (S956 in FIG. 9C), and a message to the effect that the alien substance has been removed and the document are returned. Then, a message prompting restart is displayed on the display unit 336 (S957).

After the message is displayed, it is judged whether or not the copy button has been pushed (S959). If the copy button has been pushed, control of the feeding-document reading (S931) is restarted. On the other hand, if the copy button has not been pushed at step S959, then the sequence proceeds to judgment on timeout (S960). If the copy button is not pushed within a predetermined time, then the control flow ends. When it is judged at the timeout judgment (S960) that the time is before predetermined time, then the sequence returns to step S959 and goes to the copy button waiting state.

If an alien substance is detected as a result of the alien substance detection judgment (S955), the sequence proceeds to step S915 in the case where it is judged as a result of judgment on the number of times of alien substance detection (S962) that the number of times is a predetermined number of times or less. Then, detection of an alien substance location, calculation of a light emitting element and storage of new alien substance location information are performed. However, if the number of times is n at step S962, then it is judged that removal of the alien substance is difficult (for example, because of partial breakage of the original plate at the scanning location). Then, a message to the effect that this will be coped with by the fixed-scan reading and a message which prompts setting of documents are displayed (S963), and the sequence goes to the copy button waiting state in the fixed-document reading flowchart at step S921.

Description has been made on a method of controlling document scanning in an image reading apparatus equipped with a belt-feeding type document feeder, with the flowcharts as described above.

Example of the Procedure for the Plate Cleaning Mode

Figure 10A:
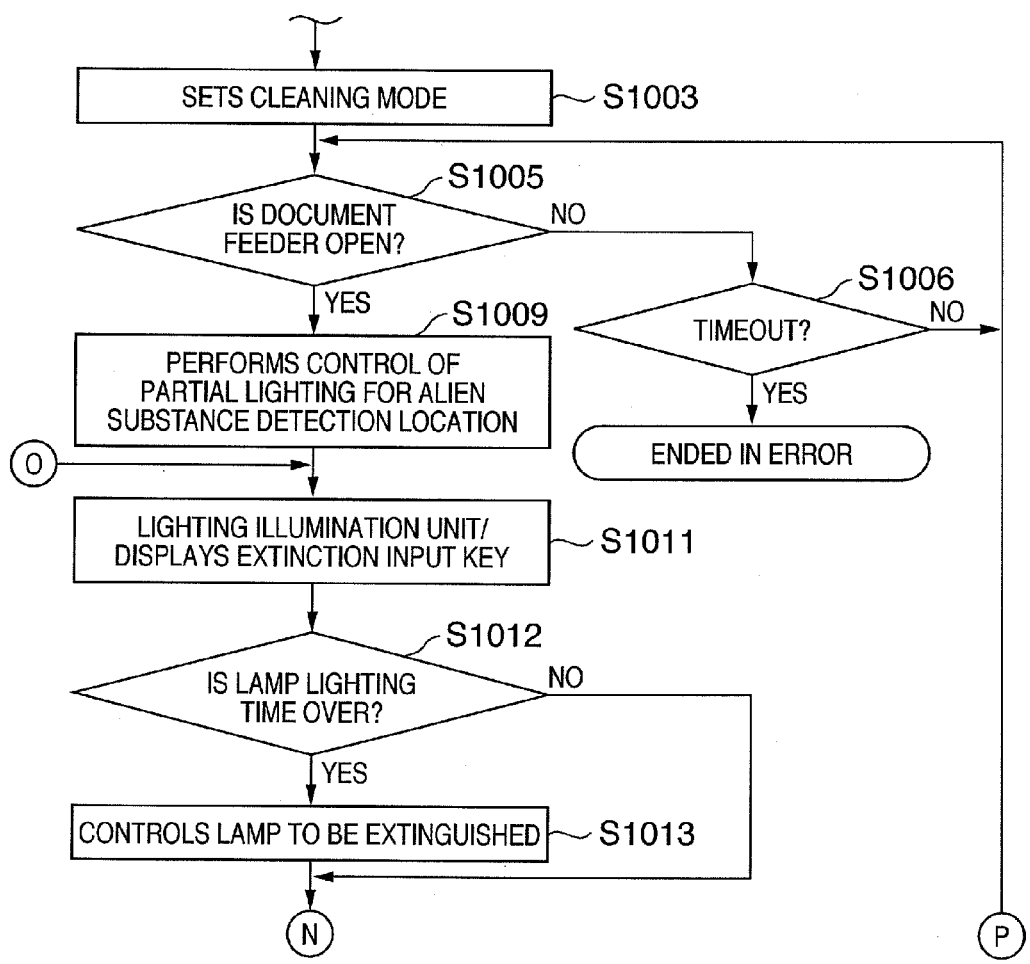
FIGS. 10A and 10B are control flowcharts of a plate cleaning mode.
Figure 10B:
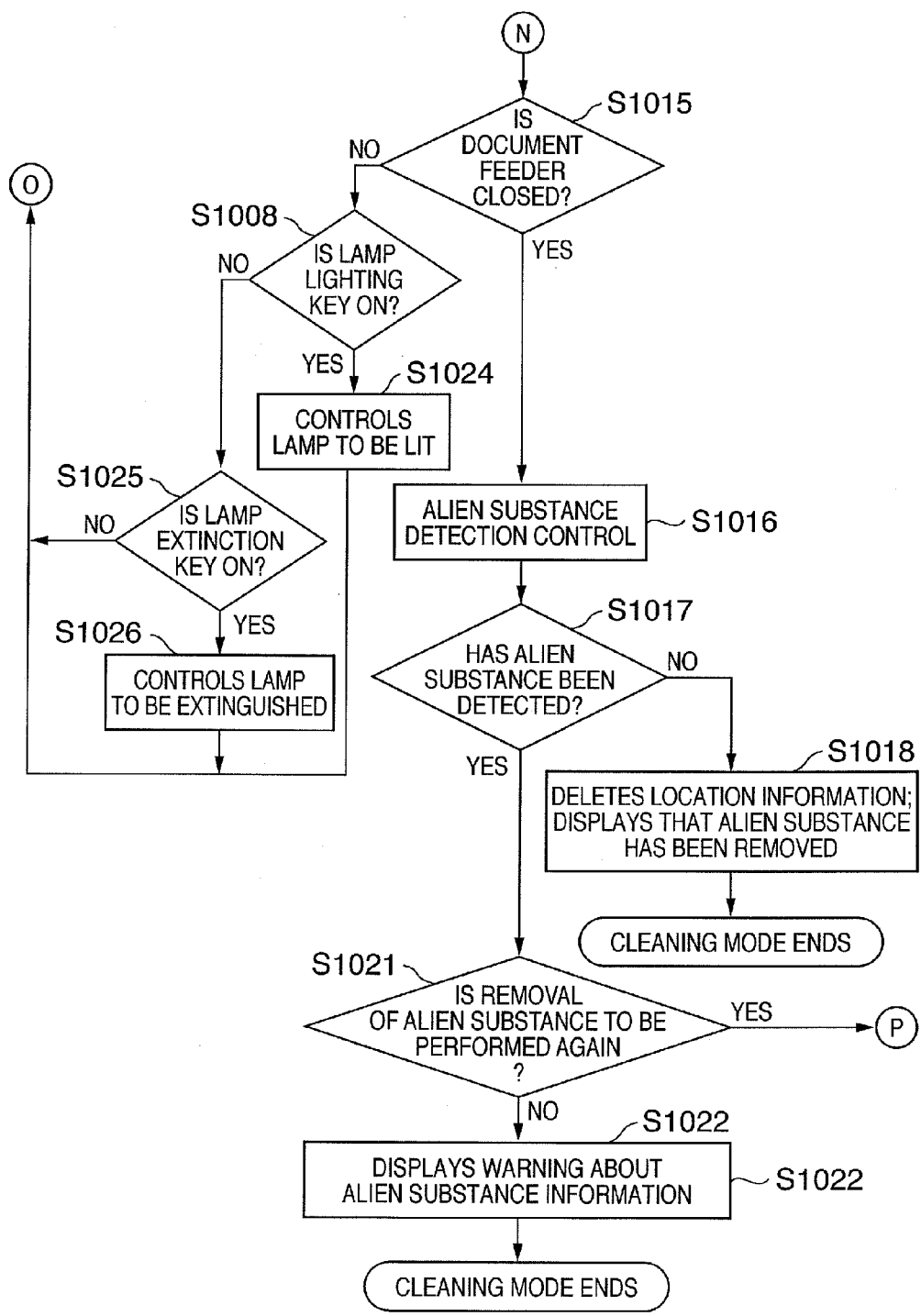

Next, an example of the procedure for the plate cleaning mode will be described with reference to flowcharts in FIGS. 10A and 10B.

This procedure is an example of the procedure for an alien substance cleaning work in the situation as shown at step S802 in FIG. 8A or at step S902 in FIG. 9A. That is, it shows the alien substance cleaning work to be performed by a user when cleaning of an alien substance adhering to the glass surface at the document scanning location was not performed in the previous job (the content of the alien substance location storage unit is not cleared) as a flowchart. As for this mode, there is no difference between the roller-feeding type document feeder and the belt-feeding type document feeder described above, and the flowchart is common to both of them.

If the user selects the cleaning mode at step S1003 when a message to the effect that an alien substance adheres at the document flowing location is displayed on the display unit 336 at step S802 in FIG. 8A or step S902 in FIG. 9A, then the image reading apparatus starts control as a plate cleaning mode which is different from the image reading sequence. In this case, a screen for setting the cleaning mode is indicated by an input key like a mode setting key 1313 provided for a display unit 1311 shown below in FIG. 13. When the plate cleaning mode is set, the sequence proceeds to judgment on the open/close state of the document feeder (S1005).

When it is judged at step S1005 that the document feeder is closed, if the time is before a predetermined time as a result of judgment on timeout (S1006), then the sequence returns to step S1005 and waits for the document feeder to be opened. However, at step S1006, if no operation is performed even after the predetermined time, then timeout is judged, and the sequence is terminated.

However, normally, the document feeder is opened because cleaning of the glass is assumed, and control of partial illumination on an alien substance detection location is executed (S1009). The alien substance adhering to the glass surface at the document scanning location is illuminated under the partial illumination control (S1009). A cleaning area is thereby shown to the user, and the visibility of the alien substance on the glass surface is improved by emitting light from the back of the glass. The user performs a cleaning work for the shown area.

During the cleaning work, a timer works in response to the lighting control of the document illumination unit. When time exceeds a predetermined time, control to extinguish the lamp is performed. The lamp extinguished during the cleaning work can be controlled to be lit again by operating a key 1315 shown in FIG. 13. The timer processing for lighting the lamp continues until the document feeder is closed. The above control will be described with the use of the flowchart. After control of partial illumination on the alien substance detection location is started (S1009), the lighting/extinction input key for the illumination unit is displayed (S1011). If, as a result of judgment on whether the lamp lighting time is over (S1012), the continuous lighting time of the lamp is longer than a predetermined time, then the sequence proceeds to step S1013, performs control to extinguish the lamp and proceeds to step S1015. If the continuous lighting time of the lamp is shorter than the predetermined time, then the sequence proceeds to step S1015 with the lamp kept being lit.

If, as a result of judgment on whether or not the document feeder is closed (S1015), the document feeder is opened, and the lamp lighting key is turned on (YES at S1008), then control to re-light the lamp when the lamp is off is performed at step S1024, and the sequence returns from step S1011 to the alien substance cleaning routine. If the lamp lighting key is not pushed at step S1008, then the sequence proceeds to judgment on whether or not to control to extinguish the lamp (S1025). If the lamp extinction key is pushed at step S1025, then control to extinguish the lamp is performed at step S1026, and the sequence returns from step S1011 to the alien substance cleaning routine. However, if nothing is inputted at step S1025, then the sequence proceeds to step S1011 without doing anything.

Then, when cleaning of the alien substance ends, and the document feeder is closed (YES at S1015), alien substance detection control is executed (S1016). If no alien substance is detected as a result of judgment on the alien substance detection (S1017), then the sequence proceeds to step S1018. The alien substance location information is deleted. At the same time, it is displayed that alien substance removal has completed, and then the cleaning mode ends. If an alien substance is detected as a result of the alien substance judgment (S1017), then the sequence proceeds to judgment on execution of re-removal of the alien substance (S1021). If re-cleaning is selected from an input unit not shown, then the sequence returns to step S1005 and restart control from the beginning of the plate cleaning mode.

However, as stated in the above description, alien substances include a scratch or a hole on the glass, which cannot be improved by cleaning. In such cases, it is normally required to exchange the original plate or the feeding-document reading glass. However, because spare plate or glass is not prepared at hand in most cases, re-cleaning is not selected at step S1021. Therefore, the cleaning mode is terminated via a warning display showing alien substance information (S1022). In such a case, it is necessary to have a service person to perform the exchange work, and the work is beyond the range of the maintenance work by a user.

Through the flowcharts described above, it is possible to, by prompting a user to perform a cleaning work, assist the user in performing the alien substance cleaning and guide him to perform an operation of improving image quality within a short time.

The above description of the flowchart shows only one approach for executing the control of illumination of a document illumination unit on an alien substance detection location, which is the present invention. At which timing the alien substance location should be shown to a user depends on the situation. That is, in this example, the alien substance location illumination unit is controlled to be lit in synchronization with the timing when the document feeder is opened. However, it goes without saying that the same effect can be obtained even if control is performed to illuminate only an alien substance location when an alien substance is detected.

Example of Detection of an Alien Substance and Detection of an Alien Substance Location Next, the configurations of an alien substance location detection unit and an alien substance detection unit will be described with reference to FIG. 11.

Figure 11:
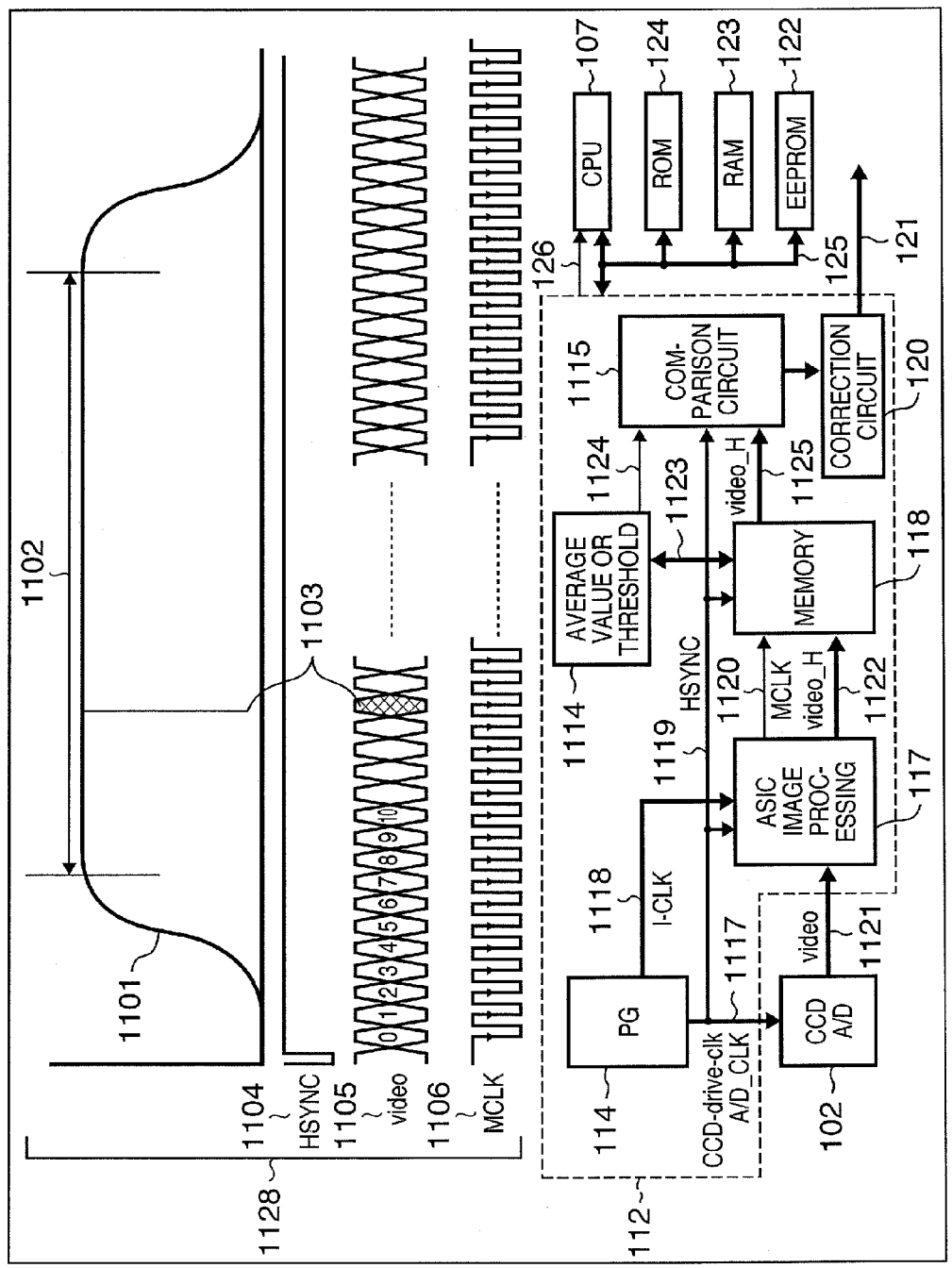
FIG. 11 is a block diagram illustrating an example of the configuration of an alien substance detection unit.

Reference numeral 1128 in FIG. 11 denotes signals inside the image reading apparatus. Here, reference numeral 1101 denotes a reading signal in main-scanning-direction read from the roller or the belt between fed documents by the CCD 115 in the image reading apparatus. An image area 1102 where the actual light reflected from a document is read and an alien substance pixel 1103 are indicated. In this case, a drive control signal (not shown) for the CCD 115 is driven in synchronization with an HSYNC 1104. Therefore, a video signal 1105 and an MCLK 1106 relative to the HSYNC are controlled to be in the equal phase. In this example, the MCLK is a signal for sampling a video signal and is defined as a signal which can be also used as a count signal. Though a concrete example of the circuit is omitted, it is commonly possible to detect the location of a target pixel by a counter unit to be reset by the HSYNC, a count clock, a line memory and a CPU.

Reference numeral 112 in FIG. 11 denotes a block diagram of the alien substance detection unit, which corresponds to the signal processing unit 112 in FIG. 1. To the alien substance detection unit 112, the CPU 107, the ROM 124, the RAM 123, and the EEPROM (a non-volatile memory) 122 are connected via an address data bus 125. As stated before, the control program for the image reading apparatus is stored in the ROM 124. With reference to parameters generated in the RAM 123 during control of reading or an alien substance detection result written in the EEPROM 122, image reading control is performed.

As already described, a non-volatile memory is desirable as a unit for storing the location of an alien substance. This is because the content of the non-volatile memory is not erased by control of the power source of the apparatus. However, even when a volatile memory or a RAM is used, it is possible to judge whether or not an alien substance will be a problem by performing control of alien substance detection when the power source is turned on.

Next, the configuration of the alien substance detection unit 112 will be described. A PG unit 114 generates a drive clock 1117 for the image reading unit 102 configured by the CCD 115 and the A/D conversion unit 116 and generates a control signal (1-CLK) 1118 for the ASIC (image processing unit) 117 into which a video signal 1121 outputted from the image reading unit 102 is inputted. In FIG. 11, control is performed in synchronization with an HSYNC 1119, and a video_H 1122 for which signal level adjustment has been performed is stored in the memory 118 (corresponding to the storage unit 118 in FIG. 1) by an MCLK 1120. Next, the data inside the memory 118 is read via a communication line 1123, and a pixel where an alien substance exists is identified by making a comparison by a comparison circuit 1115 between a comparison reference value 1124 set by a threshold setting unit 1114, which is for setting an alien substance judgment level, calculating the average value within an image area 1102, and a video_H signal 1125 outputted from the memory 118.

The reason why an alien substance can be detected by this approach is that, as shown in FIG. 6, values read from a rotating roller or a rotating belt, at the interval between a document being fed and a document to be fed next are almost steady during control of alien substance detection being performed. Reference numeral 120 denotes a correction circuit unit (the image correction unit in FIG. 1) for performing correction for the pixel of a detected alien substance, and it outputs a corrected output or a through output for which correction has not been performed, along an arrow 121 to an external apparatus.

The average value/threshold setting unit 1114 in this example is assumed to calculate an average value of the data from the memory 118 and set a value obtained by subtracting a predetermined value from the average value as a threshold. Actually, however, it is possible to set a proper value (a fixed value) and judge the value of a read pixel below the set proper value. If the area used for determining the average value is large, wrong alien substance judgment may be made due to unevenness of the reading levels. Therefore, control is performed not by using a simple average value but by using a value obtained by subtracting a predetermined value from the average value as a judgment level.

Figure 12:
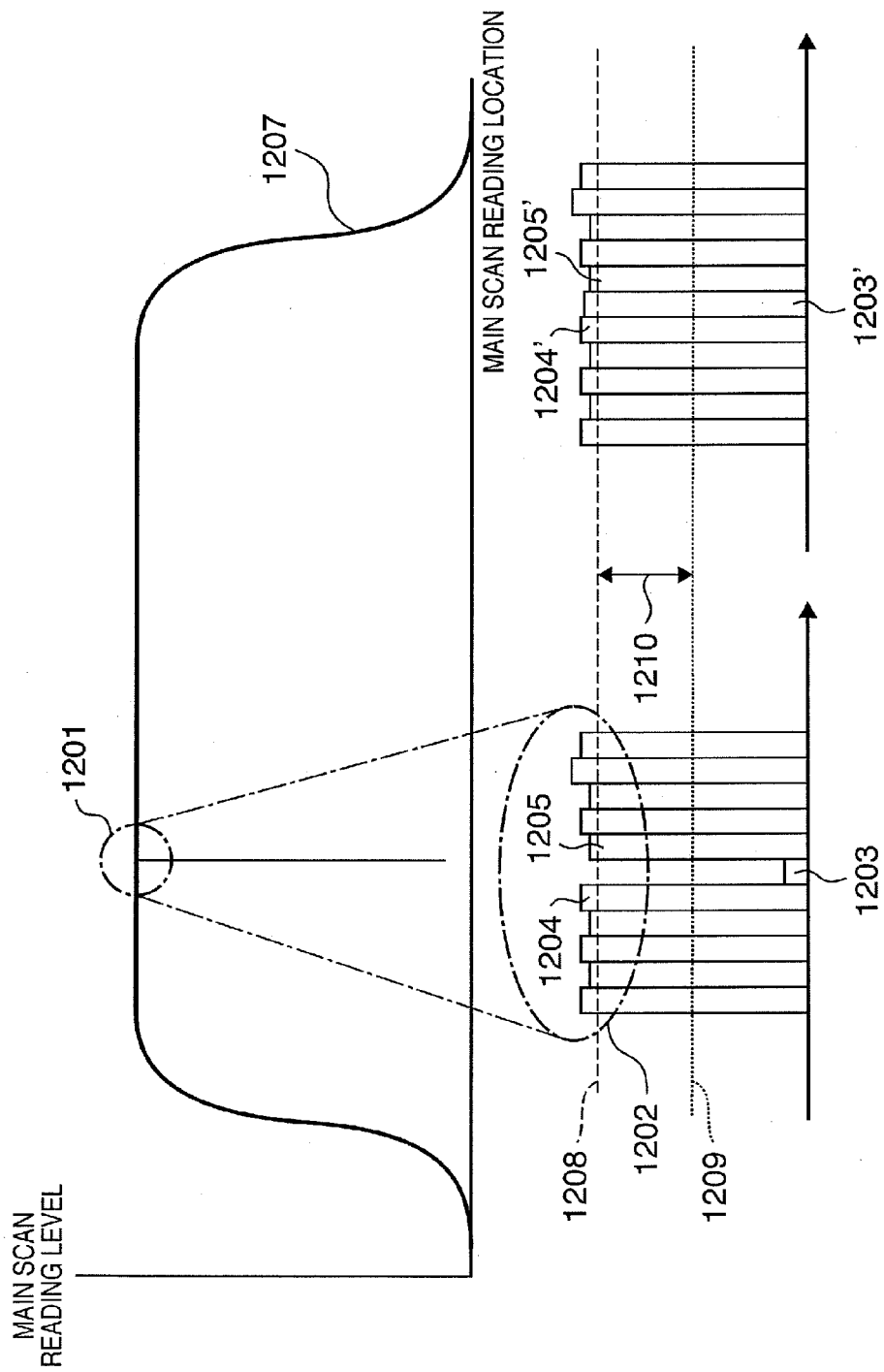
FIG. 12 is a diagram illustrating a method of correcting a defective pixel caused by an alien substance.

FIG. 12 shows the alien substance correction processing performed by the image correction unit 120.

Reference numeral 1207 in FIG. 12 denotes the image signal in main-scanning-direction read by the CCD 115, in similar to the image signal 1101 in FIG. 11. Reference numeral 1201 denotes an alien substance detection area, and reference numeral 1202 denotes an example of a magnification display of the alien substance detection area 1201.

In the figure, reference numeral 1208 denotes an average value in an image area like the image area 1102 in FIG. 11. If a level 1209 obtained by subtracting a predetermined value 1210 from the average value 1208 is set as an alien substance judgment reference, Point 1 (a pixel 1203) is an alien substance detection point in the image area 1202. In this case, if correction processing is performed by performing linear interpolation from the values of Point 2 (a pixel 1204) and Point 3 (a pixel 1205), which are neighbor pixels, then an average value of the neighbor pixels is simply calculated as processing of the two neighbor pixels. That is, Point 1' (a pixel 1203')=(Point2+Point3)/2.

Thereby, in the relation among the pixels 1203, 1204 and 1205, the abnormal point (the alien substance pixel 1203) is supplemented to be the pixel 1203', and a factor of a line-like image due to an alien substance is corrected. A simple correction method of making correction from the levels of adjacent pixels will be shown for clarification of description. However, it goes without saying that it is possible to make correction for a large alien substance involving multiple pixels by increasing the number of pixels used for the linear interpolation. By setting a weighting factor with each alien substance-detected pixel as the center, influence of adjacent alien substance-detected pixels can be reduced. However, since the alien substance detection approach itself is not a main target of the present invention, detailed description of the approach will be omitted.

Example of Display on the Display Unit

Figure 13:
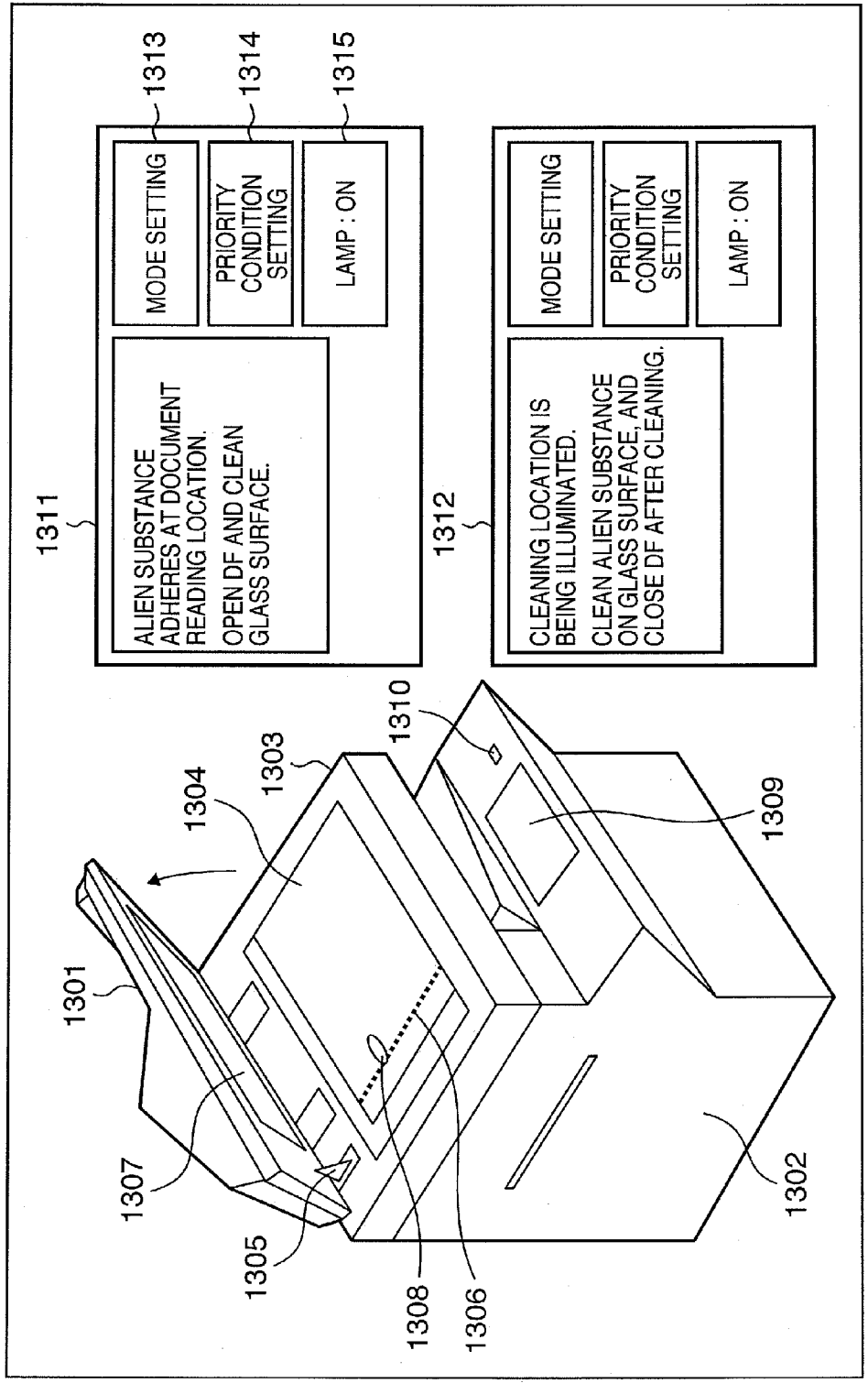
FIG. 13 is a diagram illustrating a display message and soft keys on a display unit in an alien substance cleaning mode.

FIG. 13 shows an example of display on the display unit stated in the description of the flowcharts shown in FIGS. 8A to 8C, FIGS. 9A to 9D, and FIGS. 10A and 10B.

Here, reference numeral 1301 denotes a belt-feeding type document feeder, and reference numeral 1307 denotes a document feeding belt. Documents (not shown) are set on the document feeder and fed over original plate 1304 at a constant speed in synchronization with a copy button 1310 being pushed. In FIG. 13, the document feeder is open. If documents are set when the document feeder is closed, the image reading apparatus starts detection of an alien substance when the documents are set.

In this case, when an alien substance is detected, an alien substance detection message 1311 is displayed on a display unit 1309 (corresponding to the display unit 336 in FIG. 3 and the display unit 711 in FIG. 7) provided on an image forming apparatus (a printer) 1302 to prompt cleaning of the glass surface. Here, reference numerals 1313, 1314 and 1315 denote soft keys set on the display unit 1309, and the functions which can be set by the respective keys are as follows.

Mode setting key 1313: feeding-document reading, feeding-document reading on the assumption of accepting occurrence of a line-like image, feeding-document reading by performing image correction processing, and fixed-document reading.

Priority condition setting key 1314: giving priority to productivity of document reading, or to image quality during reading of document.

LAMP_ON/OFF key 1315: setting of lighting/extinction of an alien substance location illumination unit at the document feeding location in the glass surface cleaning mode.

In this case, when a user gives priority to removal of an alien substance at the document scanning location, the document feeder 1301 is opened for cleaning of the alien substance. An image reading apparatus 1303 detects that the document feeder is open from the state of an open/close state detection switch 1305 of the document feeder, lights only a light emitting element corresponding to an alien substance detection area 1308, in a document illumination unit 1306 configured by multiple light emitting elements, and clearly shows the alien substance location to the user. In this case, a message 1312 is displayed to the effect that the location to be cleaned is being illuminated and that the document feeder is to be closed after cleaning ends.

Example of Configuration of the Document Illumination Unit

Figure 14:
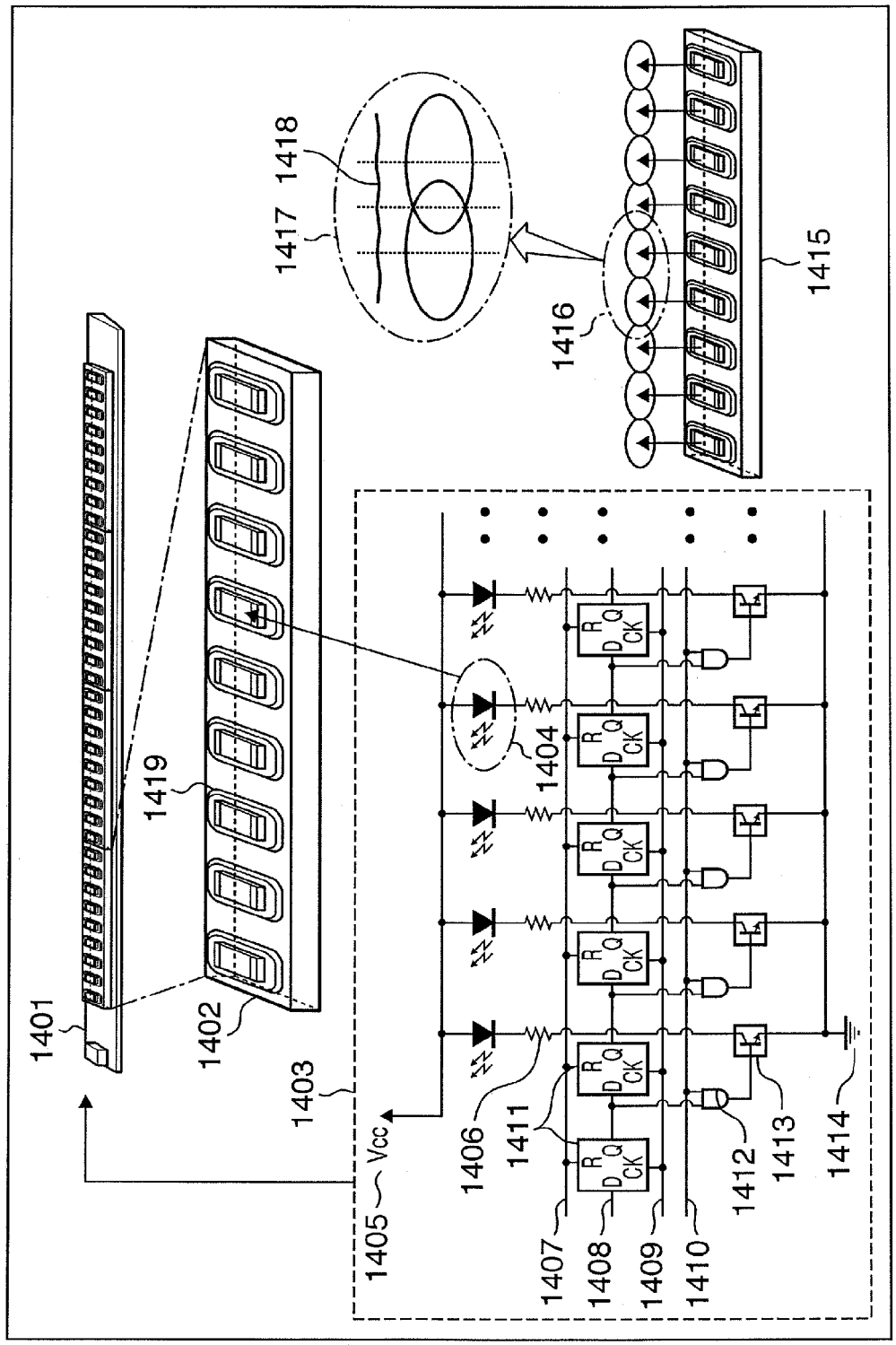
FIG. 14 is a diagram illustrating an example of the configuration of a document illumination unit of this embodiment.

Next, the configuration of the document illumination unit will be described with reference to FIG. 14.

Reference numeral 1401 denotes an external view showing an example of the document illumination unit of this example, which is configured by connecting multiple light emitting element arrays shown in a figure 1042. The document illumination unit emits light with a predetermined angle onto a document (not shown), though it is not shown in the external view 1401 in detail. Therefore, by configuring a base unit on the light emitting element array shown in the figure 1402 so that it has a slope the angle of which can be set, or by forming a slope in advance at the position where the document illumination unit 1401 is to be attached, it is possible to efficiently perform illumination on a document and guidance of a light reflected from the document into the CCD. Furthermore, white light is required for the document illumination apparatus in order to improve color reproducibility during reading a document. Therefore, a resin cap is added in which fluorescent substance (coating material) for converting light emitted from a light emitting element 1419 into white light is applied to the inner surface.

Furthermore, as a problem seen in common techniques, when a document is illuminated by multiple light emitting elements constituting a document illumination unit, the illumination distribution of the light emitting elements is formed in a concentric fashion, and thereby unevenness of light intensity among the light emitting elements is caused. Therefore, in this example, adjacent light emitting elements are arranged so that the light intensity distributions thereof are overlapped with each other as shown in a magnified figure 1417, to form the light intensity distribution (1416) of illumination on the original plate from the light emitting element array 1415. Thereby, document illumination light 1418 for which unevenness of light intensity distribution is prevented can be obtained. Similarly, it is also possible to use a document illumination apparatus in which light emitting elements are formed in zigzag to narrow the interval between the light emitting elements and thereby obtain steadier light intensity distribution, though it is not shown in the figure. Depending on whether correction of light distribution is to be performed by image processing or to be handled by the configuration of a light source, there are some options in designing an image reading apparatus.

Though it is possible to perform control to light each of the light emitting elements (for example, white LED's) of the document illumination apparatus in this example, a control circuit for lighting an array of light emitting element (white LED's) 1403 will be shown next.

Reference numeral 1404 denotes one of the light emitting elements (white LED's) formed in an array. Reference numeral 1406 denotes a resistance for controlling the current of each light emitting element, and the light intensity of the light emitting element is judged by a current value controlled by the resistance. Reference numeral 1411 denotes a shift register for sequentially transferring an on/off control signal (H or L level) of each light emitting element (white LED) which is provided as serial data. The role of each input signal of control signals 1407, 1408, 1409 and 1410 is as follows.

Clear signal 1407: this is a clear signal for the shift registers 1411, which sets the state of the output terminal of each shift register to a default value. In the case of the "High" level, it keeps the state of the shift register. In the case of the "Low" level, it clears all the registers to the "Low" level.

Serial light emitting element selection signal 1408: this transfers the number of "High" or "Low" level signals corresponding to the number of the light emitting elements constituting the document illumination apparatus by serially connecting them. Data is outputted so that the light emitting elements selected by the light emitting element selection unit 110 are to be at the "High" level.

Shift clock (data transfer clock) 1409: the number of shift clocks corresponding to the number of light emitting elements are used, and the light emitting element selection signals 1408 are sequentially transferred to the shift registers 1411.

Lamp ON/OFF control signal 1410: the lamp is controlled to be illuminated in the case of the "High" level, and is controlled to be extinguished in the case of the "Low" level.

Circuit operations to be controlled by the above control signals are as shown below.

In the condition the clear signals 1407 are kept at the "High" level, based on a pixel location on the CCD identified by the alien substance detection unit, a light emitting element to illuminate a corresponding pixel area on the CCD is selected. Only the serial light emitting element selection signal 1408 of the selected light emitting element (white LED) is provided at the "High" level. The serial light emitting element selection signal 1408 is set for each shift register by the shift clock (data transfer clock) 1409 for transferring the serial light emitting element selection signal 1408 to the number of prepared shift registers 1411 corresponding to the minimum number of light emitting elements.

Each of the light emitting element selection signals 1408 set for the respective shift registers 1411 is connected to an AND circuit 1412. When the lamp ON/OFF control signal 1410 is turned on ("High"), the output of the AND circuit 1412 corresponding to the control circuit unit of the selected light emitting element (white LED) becomes "High". The output of the AND circuit 1412 is provided for a transistor 1413 having a role of a light emitting element lighting control switch, and the transistor 1413 is turned on. Then, a current flows from a power source Vcc 1405 connected in common to the elements to a GND 1414 via the light emitting element 1404, the light intensity control resistance 1406 and the light emitting element illumination control transistor 1413 to provide the current for the light emitting element (white LED) 1404 and perform lighting control.

Example of Controlling Illumination on an Alien Substance Location

Figure 15:
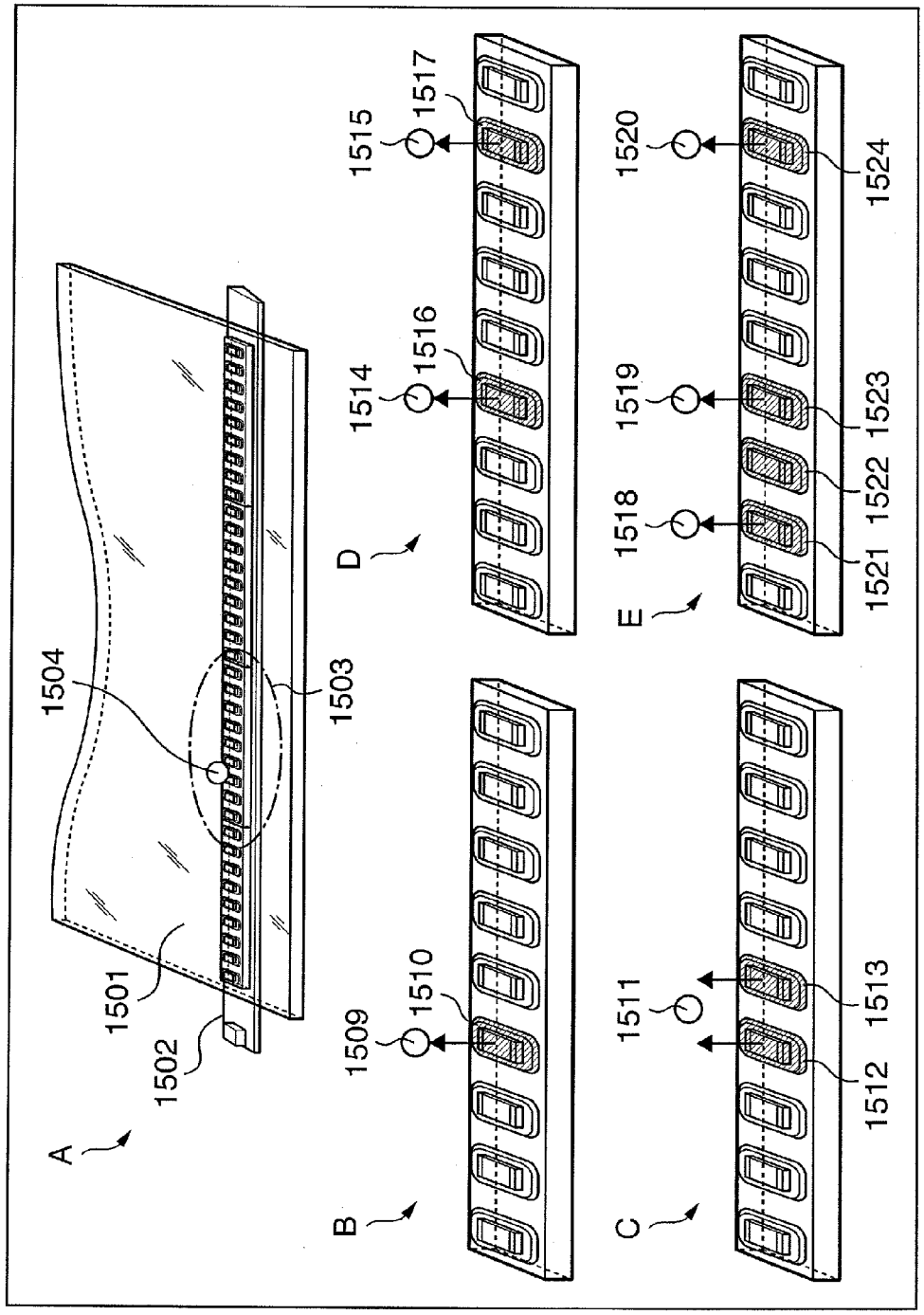
FIG. 15 is a diagram illustrating some examples of lighting control in an alien substance location illumination unit of this embodiment.

FIG. 15 shows examples of controlling, based on the result of detection of an alien substance, lighting of a corresponding light emitting element of the document illumination apparatus.

In FIG. 15, "A" shows that an alien substance 1504 adheres to original plate 1501, and that a part of a document illumination unit 1502 arranged at a document scanning location is lit. Reference numeral 1503 denotes an area which is a partially selected light emitting element array, and in FIG. 15, "B" to "E" show the magnified figure thereof.

In the example "B" of FIG. 15, an alien substance 1509 is located almost just above one light emitting element 1510, and control is performed to light the only one light emitting element and show the alien substance location.

In the example "C" of FIG. 15, an alien substance 1511 is located between two light emitting elements 1512 and 1513. Control is performed to light the light emitting elements 1512 and 1513 to show the location of the alien substance 1511 located between them.

In the example "D" of FIG. 15, two alien substances 1514 and 1515 exist, and the interval between the alien substances 1514 and 1515 corresponds to distance in which three light emitting elements exist. Since the alien substances are located in the vicinity of the light emitting elements 1516 and 1517, respectively, control is performed to individually light each of the light emitting elements 1516 and 1517 to show the alien substance locations.

In the example "E" of FIG. 15, alien substances 1518, 1519 and 1520 exist at three locations. Since the interval between the alien substances 1518 and 1519 corresponds to distance in which only one light emitting element exists, control is performed to illuminate the whole area corresponding to the light emitting elements 1521 to 1523 rather than lighting only the light emitting elements 1521 and 1523. As for the alien substance 1520, the location of the alien substance 1520 is illuminated and shown by the neighbor light emitting element 1524.

Figure 16:
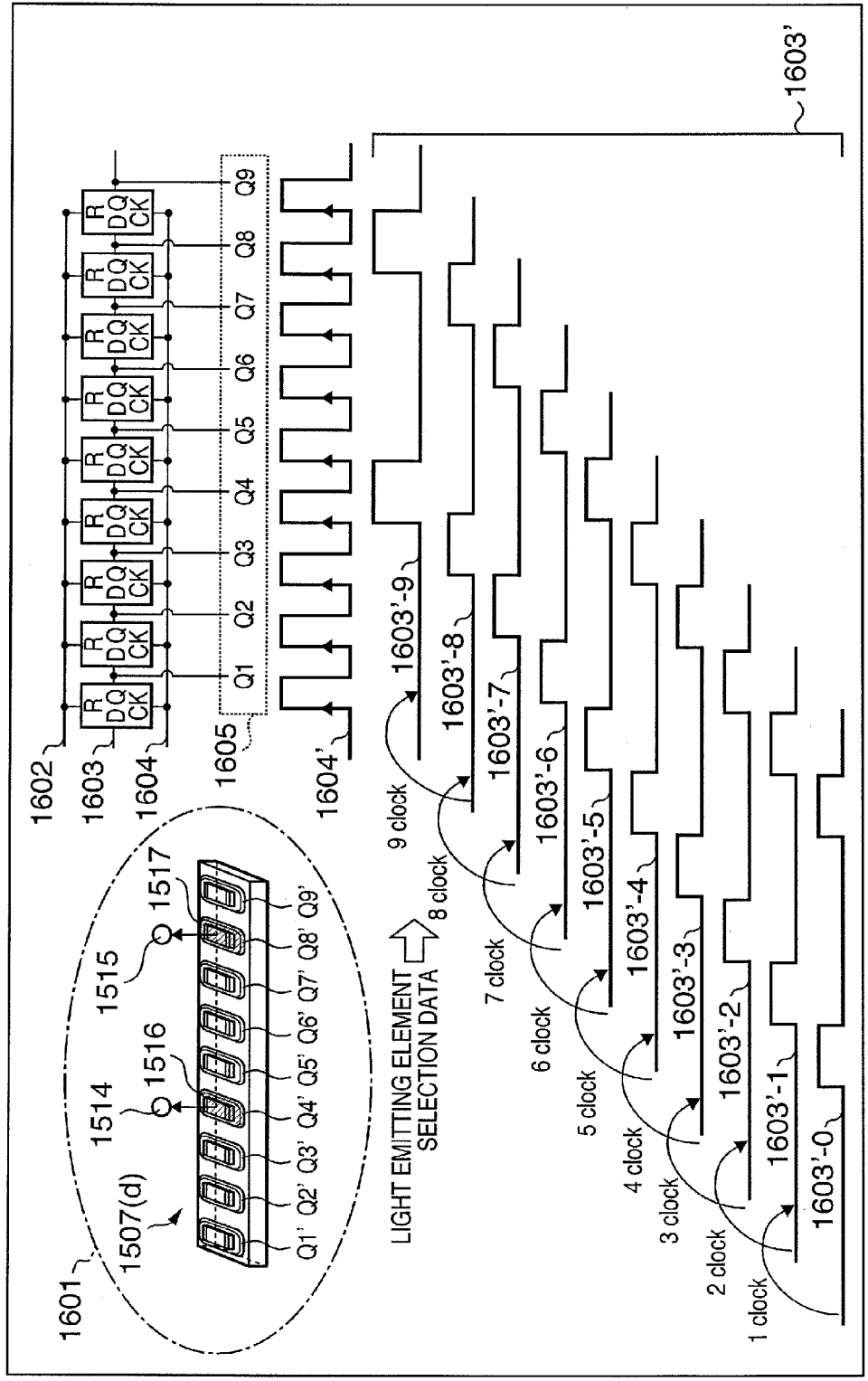
FIG. 16 is a diagram illustrating a method of individually lighting light emitting elements constituting the document illumination unit of this embodiment.

Finally, FIG. 16 shows the condition of data setting control about illumination of the alien substance location by the shift register.

Reference numeral 1601 denotes a figure showing the lighting condition of the light emitting element array in the example of "D" of FIG. 15. Reference numerals 1602, 1603, 1604 and 1605 denote a part of the shift register in the circuit configuration 1403 in FIG. 14, and the process of setting the output 1605 (Q1, Q2, Q3, Q4, Q5, Q6, Q7, Q8 and Q9) of the shift register is shown by data shift graphs (1603'-0 to 1603'-9). It is shown that the data 1603'-0 is transferred by the first clock to the ninth clock sequentially by a shift clock (transfer clock) 1604' with nine clocks, that light emitting element selection data is set as 1603'-9, and that only the shift register outputs Q4 and Q8 are set to "High".

Though the clear signal 1602 is not shown, it is kept at the "High" level during the alien substance cleaning mode. The transfer clock 1604 is stopped after the data is set, and the output from each shift register is kept constant. Shift register outputs Q1' to Q9' in the figure 1601 show the same locations as the shift register output Q1 to Q9, and control is performed to light the light emitting elements 1516 and 1517 by the lamp ON/OFF control signal (denoted by reference numeral 1410 in FIG. 14).

The present invention may be applied to a system configured by multiple pieces of equipment (for example, a host computer, interface equipment, a printer and the like) or an integrated apparatus, or may be applied to equipment configured by one piece of equipment.

For example, the present invention is applied to a color image reading apparatus for scanning a document image while controlling document feeding, an image forming apparatus (a copying machine) equipped with a black-and-white image reading apparatus, a FAX machine, a complex machine, a flat bed scanner equipped with a document feeder, and the like.

A storage medium (or a recording medium) in which a program code of software for realizing the functions of the embodiment described above are recorded is provided for a system or an apparatus. It goes without saying that the object of the present invention can be achieved by a computer (or a CPU or an MPU) of the system or the apparatus reading and executing the program code stored in the storage medium. In this case, the program code itself read from the storage medium realizes the functions of the embodiment described above, and the storage medium storing the program code constitutes the present invention. The functions of the embodiment described above are realized not only by executing the program code read by the computer. It goes without saying that such a case is also included where the operating system (OS) operating on the computer performs a part or all of the actual processing, based on the instructions of the program code, and the functions of the embodiment described above are realized by the processing.

It goes without saying that the following case is also included. The program code read from the storage medium is written in a memory provided for a feature expansion board inserted in the computer or a feature expansion unit connected to the computer; after that, a CPU provided for the feature expansion board or the feature expansion unit performs a part or all of the actual processing based on the instructions of the program code; and thereby the functions of the embodiment described above are realized by the processing.

When the present invention is applied to the storage medium, a program code including program codes corresponding to the flowcharts described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-293005, filed on Oct. 5, 2005, which is hereby incorporated by reference herein in its entirety.

What is claimed is:

1. An image reading apparatus for acquiring a read signal of an image by receiving and photoelectrically converting a light reflected from a document, comprising:
   an illumination unit having a plurality of light emitting elements adapted to illuminate a document;
   a light receiving unit adapted to receive a light reflected from the document;
   an alien substance detection unit adapted to detect a location of an alien substance on an original plate, based on the reflected light received by said light receiving unit; and
   an illumination control unit adapted to control the light emitting elements of said illumination unit to selectively illuminate the location in which the alien substance has been detected by said alien substance detection unit, wherein said illumination control unit controls light emitting elements corresponding to respective locations of detected alien substances to be lighted when a distance between detected two alien substances is equal to or longer than a predetermined distance, and light emitting elements located between detected two alien substances to be lighted when a distance between the detected two alien substances is shorter than the predetermined distance.

2. The image reading apparatus according to claim 1, further comprising a display unit adapted to display a message prompting cleaning of the alien substance when the alien substance within an original reading area has been detected by said alien substance detection unit.

3. The image reading apparatus according to claim 1, wherein said illumination control unit controls one of the light emitting elements to be lighted when the location of the detected alien substance is in neighborhood of the one of the light emitting elements.

4. The image reading apparatus according to claim 1, wherein said illumination control unit controls two light emitting elements on both sides of the location of the detected alien substance to be lighted when the location of the detected alien substance is between the two light emitting elements.

5. The image reading apparatus according to claim 1, wherein said alien substance detection unit detects whether or not one or more alien substance exists by comparing an amount of reflected light received by each of the light receiving elements with a threshold determined based on an average value of an amounts of reflected light received by a predetermined number of light receiving elements, while no document is placed on the original plate.

6. The image reading apparatus according to claim 1, further comprising:
a first image acquisition unit adapted to acquire a read signal of a document with feeding the document when no alien substance is detected; and
an image acquisition control unit adapted to control a read signal of a document to be acquired in a way different from a way of said first image acquisition unit, when one or more alien substance is detected but it is instructed to acquire the read signal of the document.

7. The image reading apparatus according to claim 6, wherein said acquisition control unit controls the read signal of the document to be acquired with fixing the document and causing said illumination unit and light receiving unit to scan the document in a sub-scanning direction.

8. The image reading apparatus according to claim 6, wherein said acquisition control unit controls a read signal in an area having an alien substance location to be interpolated.

9. The image reading apparatus according to claim 1, further comprising an instruction unit adapted to receive an instruction from a user.

10. The image reading apparatus according to claim 9, wherein said instruction unit comprises any of a unit adapted to give an instruction whether or not to give priority to cleaning of an alien substance, a unit adapted to give an instruction to receive a light reflected from a document by causing said illumination unit and light receiving unit to scan a document in a sub- scanning direction, and a unit adapted to give an instruction to interpolate a read signal in an area having an alien substance.

11. The image reading apparatus according to claim 9, further comprising a display unit adapted to display a message inquiring whether or not to accept acquisition of a read signal of the document when the alien substance is detected, wherein said instruction unit comprises a unit adapted to receive an instruction for accepting acquisition of the read signal from a user.

12. An image processing apparatus including an image reading apparatus, said image reading apparatus comprising:
an illumination unit having a plurality of light emitting elements adapted to illuminate a document;
a light receiving unit adapted to receive a light reflected from the document;
an alien substance detection unit adapted to detect a location of an alien substance on an original plate, based on the reflected light received by said light receiving unit; and
an illumination control unit adapted to control the light emitting elements of said illumination unit to selectively illuminate the location in which the alien substance has been detected by said alien substance detection unit,
wherein said illumination control unit of the image reading apparatus controls:
one of the light emitting elements to be lighted when the location of the detected alien substance is in neighborhood of the one of the light emitting elements;
two light emitting elements on both sides of a location of the detected alien substance to be lighted when the location of the detected alien substance is between the two light emitting elements;
light emitting elements corresponding to respective locations of detected alien substances to be lighted when a distance between detected two alien substances is equal to or longer than a predetermined distance; and
light emitting elements located between detected two alien substances to be lighted when a distance between the detected two alien substances is shorter than the predetermined distance.

13. A method of controlling an image reading apparatus for acquiring a read signal of an image by receiving and photoelectrically converting a light reflected from a document, the method comprising the steps of:
detecting a location of an alien substance on an original plate based on a reflected light received by a light receiving unit adapted to receive a light reflected from a document; and
controlling an illumination unit adapted to illuminate a document, to selectively illuminate the location in which the alien substance has been detected when the alien substance has been detected in said alien substance detection step,
wherein in said illumination control step:
one of the light emitting elements is controlled to be lighted when a location of the detected alien substance is in neighborhood of the one of the light emitting elements;
two light emitting elements on both sides of a location of the detected alien substance are controlled to be lighted when the location of the detected alien substance is between the two light emitting elements
light emitting elements corresponding to respective locations of detected alien substances are controlled to be lighted when a distance between detected two alien substances is equal to or longer than a predetermined distance; and
light emitting elements located between detected two alien substances are controlled to be lighted when a distance between the detected two alien substances is shorter than the predetermined distance.

14. A method of displaying an alien substance location in an image reading apparatus for acquiring a read signal of an image by receiving and photoelectrically converting a light reflected from a document, the method comprising the steps of:

detecting a location of an alien substance on an original plate, based on a reflected light received by a light receiving unit adapted to receive a light illuminated by an illumination unit and reflected from a document; and selectively displaying a location in which the alien substance is detected, in relation to the location of the detected alien substance, wherein in said display step:

one of the light emitting elements is controlled to be lighted when a location of the detected alien substance is in neighborhood of the one of the light emitting elements;

two light emitting elements on both sides of a location of the detected alien substance are controlled to be lighted when the location of the detected alien substance is between the two light emitting elements;

light emitting elements corresponding to respective locations of detected alien substances are controlled to be lighted when a distance between detected two alien substances is equal to or longer than a predetermined distance; and light emitting elements located between detected two alien substances are controlled to be lighted when a distance between the detected two alien substances is shorter than the predetermined distance.

\* \* \* \* \*